US012138938B2

(12) United States Patent
Jonouchi et al.

(10) Patent No.: US 12,138,938 B2
(45) Date of Patent: Nov. 12, 2024

(54) PRINTING APPARATUS

(71) Applicant: CANON KABUSHIKI KAISHA, Tokyo (JP)

(72) Inventors: Tomohisa Jonouchi, Kanagawa (JP); Norio Sakurai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/670,435

(22) Filed: Feb. 12, 2022

(65) Prior Publication Data

US 2022/0258487 A1 Aug. 18, 2022

(30) Foreign Application Priority Data

Feb. 12, 2021 (JP) ................................. 2021-020359

(51) Int. Cl.

*B41J 2/175* (2006.01)
*B41J 2/045* (2006.01)
*B41J 29/393* (2006.01)

(52) U.S. Cl.

CPC ....... *B41J 2/17596* (2013.01); *B41J 2/04541* (2013.01); *B41J 29/393* (2013.01)

(58) Field of Classification Search

CPC ...... B41J 29/393; B41J 2/17596; B41J 2/175; B41J 2/04541

See application file for complete search history.

(56) References Cited

U.S. PATENT DOCUMENTS

| | | | | |
|---|---|---|---|---|
| 6,234,616 | B1 | 5/2001 | Komuro | 347/85 |
| 9,090,083 | B2 | 7/2015 | Tsuji | B41J 2/17596 |
| 10,843,481 | B2 | 11/2020 | Shimoyama et al. | B41J 2/17596 |
| 2009/0214228 | A1 | 8/2009 | Ito | 399/21 |
| 2019/0039383 | A1 | 2/2019 | Matsumura et al. | B41J 2/175 |
| 2020/0316951 | A1 | 10/2020 | Narazaki et al. | B41J 2/16532 |

FOREIGN PATENT DOCUMENTS

| | | |
|---|---|---|
| EP | 0885728 | 12/1998 |
| JP | H11-70668 | 3/1999 |
| JP | 2005022124 A | 1/2005 |
| JP | 2006-248132 | 9/2006 |
| JP | 2015-027741 | 2/2015 |
| JP | 2020168842 A | 10/2020 |

OTHER PUBLICATIONS

U.S. Appl. No. 17/670,433, filed Feb. 12, 2022.
U.S. Appl. No. 17/670,434, filed Feb. 12, 2022.

(Continued)

*Primary Examiner* — An H Do

(74) *Attorney, Agent, or Firm* — Venable LLP

(57) ABSTRACT

A printing apparatus includes a container for a liquid configured to contain a liquid to be supplied to a print head configured to eject the liquid, the container including an injection port configured to enable a user to inject the liquid; a supply channel used to supply the liquid from the container to the print head; and an on-off valve mechanism disposed at the supply channel and configured to be switched between an open state to establish communication of the supply channel and a closed state not to establish communication of the supply channel. The on-off valve mechanism is configured to be switched by any of an automatic operation and a manual operation.

20 Claims, 16 Drawing Sheets

(56) References Cited

OTHER PUBLICATIONS

Extended European Search Report dated Jun. 15, 2022 in counterpart EP Application No. 22155800.0.
Office Action dated Sep. 2, 2022 in counterpart India Application No. 202244006604, together with English translation thereof.
Japanese Office Action dated Oct. 1, 2024 in counterpart Japanese Patent Appln. No. 2021-020359.

PRINTING APPARATUS

BACKGROUND OF THE INVENTION

Field of the Invention

The present invention relates to a printing apparatus.

Description of the Related Art

There has been known a printing apparatus configured to use a tube to connect a print head for ejecting an ink to an ink tank containing the ink to be supplied to the print head.

Japanese Patent Laid-Open No. H11-70668 (hereinafter referred to as Reference 1) discloses a printing apparatus including an automatic valve, which can close a tube between a print head and an ink tank by using a driving mechanism for paper transportation.

According to the technique disclosed in Reference 1, it is not possible to close the valve in the case where a user moves the printing apparatus in a power off state. As a consequence, the ink may leak out of the printing apparatus in the case of moving the apparatus.

SUMMARY OF THE INVENTION

A printing apparatus according to an aspect of the present invention includes: a container for a liquid configured to contain a liquid to be supplied to a print head configured to eject the liquid, the container including an injection port configured to enable a user to inject the liquid; a supply channel used to supply the liquid from the container to the print head; and an on-off valve mechanism disposed at the supply channel and configured to be switched between an open state to establish communication of the supply channel and a closed state not to establish communication of the supply channel, in which the on-off valve mechanism is configured to be switched by any of an automatic operation and a manual operation.

Further features of the present invention will become apparent from the following description of exemplary embodiments with reference to the attached drawings.

DESCRIPTION OF THE EMBODIMENTS

Embodiments of the present invention will be described below with reference to the drawings. It is to be noted that the following embodiments do not intend to limit the scope of the present invention and that all the combinations of the features described in the embodiments are not always essential. The same constituents in the embodiments will be denoted by the same reference signs in the following description.

In the present specification, the term "printing" (which may also be referred to as "print") is not limited to a case of forming significant information such as characters and graphics, but encompasses formation of all significant and insignificant information. This term is also assumed to broadly include formation of images, figures, patterns, and the like on a print medium as well as processing of a print medium regardless of whether or not these objects are materialized so as to be discernible to human eyes.

Meanwhile, the term "ink" (which may also be referred to as "liquid") should also be interpreted in a broad sense as with the definition of the "printing" mentioned above. Accordingly, this term is assumed to represent a liquid which serves to form images, figures, patterns, and the like, to process a print medium, and to modify an ink (such as coagulation and insolubilization of a colorant contained in the ink to be applied to the print medium) in the case where the liquid is applied onto the print medium.

In addition, the term "print medium" not only includes paper used in general printing apparatuses but also broadly includes media that can accept the ink as typified by cloth, plastic films, metal plates, glass, ceramics, wood, leather, and the like.

First Embodiment

<Configuration of Printing Apparatus>

Figure 1:
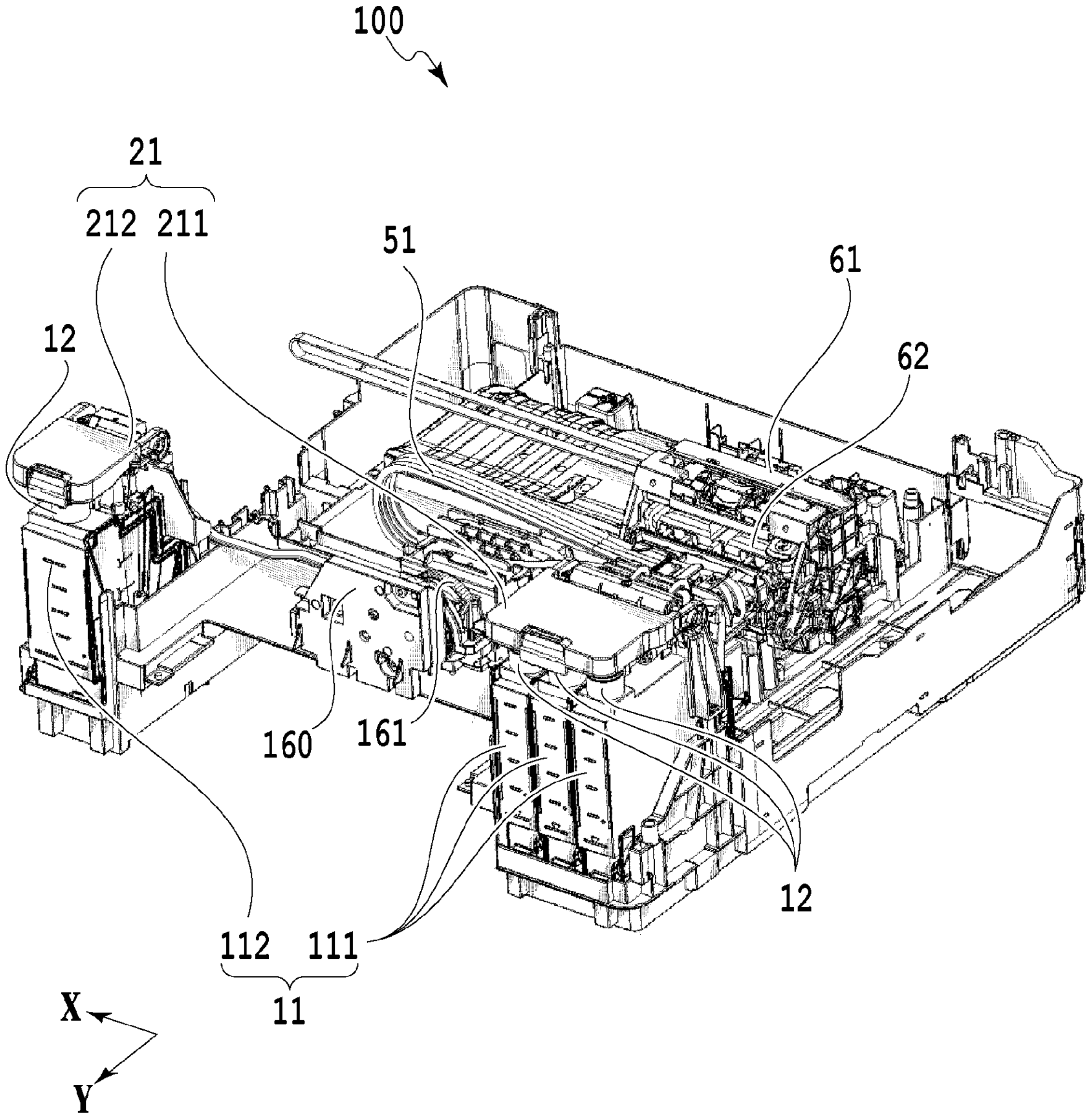
FIG. 1 is a perspective view showing a printing apparatus.

FIG. 1 is a perspective view showing a printing apparatus 100 that represents an example of a liquid ejecting apparatus of the present embodiment. FIG. 1 shows a partial configuration of the printing apparatus 100. The printing apparatus 100 includes ink tanks 11 that contain inks, a print head 62 that ejects the inks supplied from the ink tanks 11 through ink supply channels 51, and a carriage 61 that holds the print head 62. The carriage 61 is configured to scan a print medium (not shown) in a direction orthogonal to a direction of transportation of the print medium, and an image is printed on the print medium by a combination of scanning by the carriage 61 and ejection from the print head 62.

Although the present embodiment describes an example of the printing apparatus, the same applies to a case of a liquid ejecting apparatus. For example, such a liquid ejecting apparatus may include a liquid container that contains a liquid, a liquid ejecting unit that ejects the liquid supplied from the liquid container through a liquid supply channel, and a liquid ejecting unit holder that holds the liquid ejecting unit. The description will be given in the present embodiment by using the printing apparatus 100 as the example of the liquid ejecting apparatus.

Each ink tank 11 may be a first ink tank 111 or a second ink tank 112. The present embodiment shows the case of providing the multiple first ink tanks 111 on the assumption of a case of using multiple types of inks. However, in the case of using a single type of the ink, a single ink tank (such as the first ink tank 111) may only be provided. Meanwhile, the second ink tank 112 having a larger capacity than that of the first ink tank 111 may be provided in the case of using a large amount of the ink. Without limitations to the foregoing, only the second ink tanks 112 may be provided or the first ink tanks 111 and the second ink tank 112 may be provided as in the present embodiment. In the case of providing two or more ink tanks 11, the ink tanks 11 may be provided on the right and the left relative to the center of the apparatus depending on the size of the printing apparatus 100, or provided only on one side. In the present embodiment, three color ink tanks 111 that can contain cyan ink, magenta ink, and yellow ink, respectively, are provided as the first ink tanks 111. Meanwhile, one black ink tank 112 that can contain black ink is provided as the second ink tank 112. Configurations of other components shown in FIG. 1 will be described later.

The printing apparatus 100 includes feeding rollers (not shown) that feed the print media, transportation rollers (not shown) that transport the print media, and discharge rollers (not shown) that discharge the print media. The print head 62 is detachably mounted on the carriage 61 and configured to eject the inks onto a surface of a print medium transported by the transportation rollers, thus printing an image thereon. Moreover, the printing apparatus 100 includes an ink suction mechanism 64 (see FIG. 4B) provided with a suction cap 65. In order to recover an ejection performance of the print head 62, the printing apparatus 100 brings the suction cap 65 into contact with the print head 62, and suctions the inks from ink ejection ports 63 (see FIG. 4B) of the print head 62 by using the ink suction mechanism 64. Here, the ink suction mechanism 64 includes a tube connected to the suction cap 65, and a suction pump serving as a suctioning unit, for example.

The present embodiment describes an example in which the print head 62 ejects the inks in accordance with a movement associated with scanning by the carriage. However, the present invention is not limited only to this configuration. The print head may be of a so-called line type, which is provided with ink ejection ports in a region corresponding to a width of the print medium and configured to print images on the print medium without scanning by the carriage.

Figure 2:
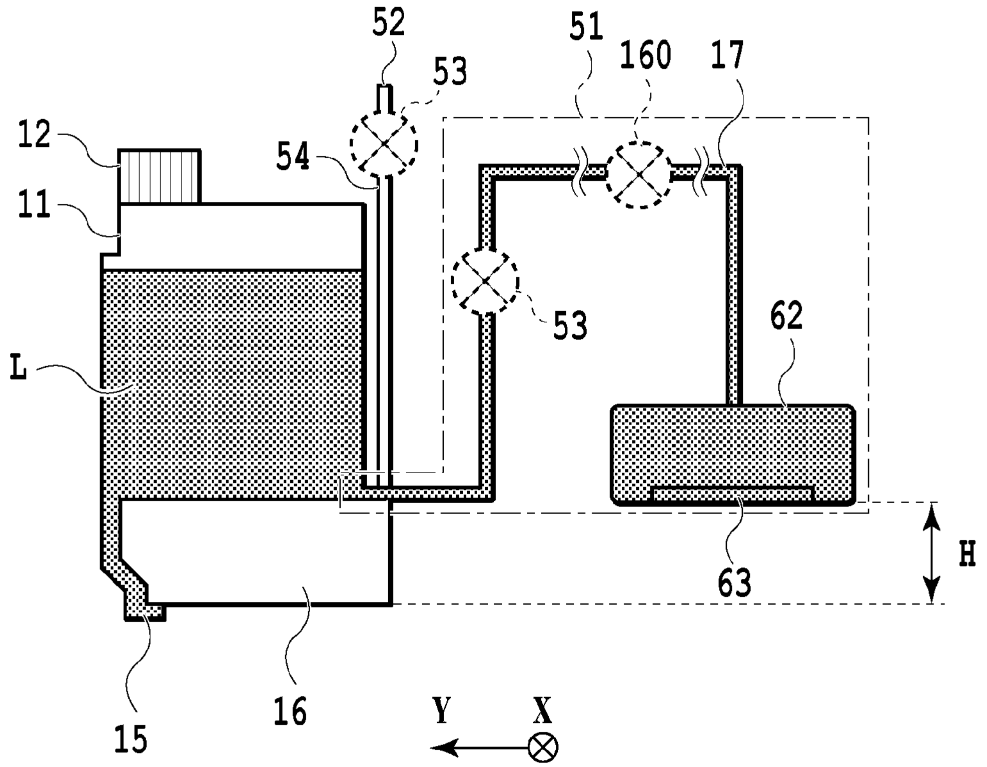
FIG. 2 is a schematic diagram showing a positional relation between an ink tank and a print head.

FIG. 2 is a schematic diagram showing a positional relation between the ink tank 11 and the print head 62. A supply tube 17 constituting the ink supply channel 51 for supplying the ink to the print head 62 is attached to the ink tank 11. Moreover, a tube constituting an atmospheric communicating channel 54 to establish communication of the inside of the ink tank 11 (a buffer chamber 16) with the atmosphere is connected to the ink tank 11. The supply tube 17 is formed from a flexible material such as an elastomer. Valve units 53 for blocking communication of a liquid or the air are provided at a portion of the ink supply channel 51 between the ink tank 11 and the print head 62 and at a portion of the atmospheric communicating channel 54 between the ink tank 11 and an atmosphere communicating opening 52, respectively.

The valve units 53 include a black side valve unit and color side valve units. The black side valve unit closes the ink supply channel 51 and the atmospheric communicating channel 54 connected to the black ink tank 112, respectively. The color side valve units close the ink supply channels 51 and the atmospheric communicating channels 54 connected to the color ink tanks 111, respectively. In the meantime, an on-off valve mechanism 160 to shut off the communication of the liquid or the air is provided at a portion of each ink supply channel 51 between the valve unit 53 and the print head 62. The on-off valve mechanisms 160 include a black side on-off valve mechanism and color side on-off valve mechanisms. The black side on-off valve mechanism closes the ink supply channel 51 connected to the black ink tank 112. The color side on-off valve mechanisms close the ink supply channels 51 connected to the color ink tanks 111, respectively. Each on-off valve mechanism 160 includes various components. Here, the black side on-off valve mechanism and the color side on-off valve mechanisms may use the same components in common or use different components from each other. Details of the on-off valve mechanisms will be described later. Differences in role between the on-off valve mechanism 160 and the valve unit 53 will also be described later.

In the printing apparatus 100 of the present embodiment, a liquid-gas replacement portion 15 of the ink tank 11 is located at a position lower by an amount H in a height direction than the ink ejection ports 63 of the print head 62 in order to prevent a leakage of the ink from the ink ejection ports 63 of the print head 62. In other words, a negative pressure originating from a water head difference corresponding to the height H is applied to the ink ejection ports 63. Meanwhile, the buffer chamber 16 is provided at a lower part of the ink tank 11. The buffer chamber 16 can store the ink to be pushed out in the case of destruction of a meniscus in the liquid-gas replacement portion 15 due to expansion of the air inside the ink tank 11 caused by an atmospheric pressure variation or a change in temperature. Thus, it is possible to suppress the leakage of the ink from the ink tank 11 through the atmospheric communicating channel 54. In FIG. 2 as well as FIGS. 4A and 4B to be described later, an open state of each of the valve units 53 and the on-off valve mechanism 160 is indicated with a dashed line and a closed state thereof is indicated with a solid line.

Next, a configuration of an ink supply system and a flow from a point of injection of the ink to a point to enable image printing in the present embodiment will be described with reference to FIGS. 3A to 5. FIGS. 3A to 3D are perspective views of the printing apparatus 100 according to the present embodiment. FIGS. 3A to 3D are the perspective views illustrating a process of transition from a state in FIG. 3A to a state in FIG. 3D in which a user can inject the ink into the ink tank 11. FIGS. 4A and 4B are schematic diagrams showing states of the ink tank 11 and the print head 62 according to the present embodiment.

Figure 3A:
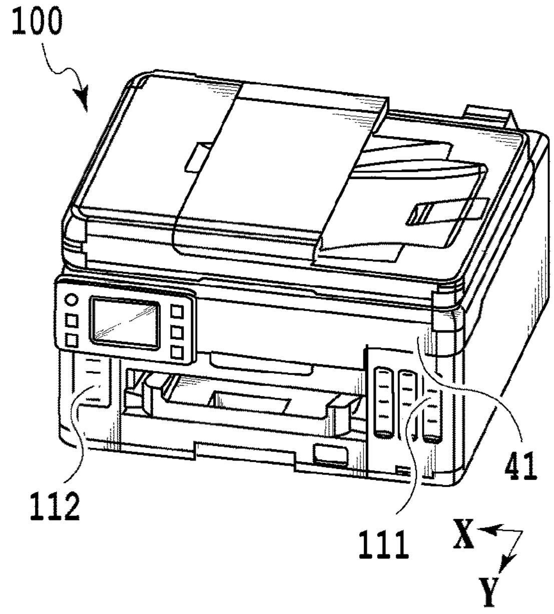
FIGS. 3A to 3D are perspective views of the printing apparatus.
Figure 4A:
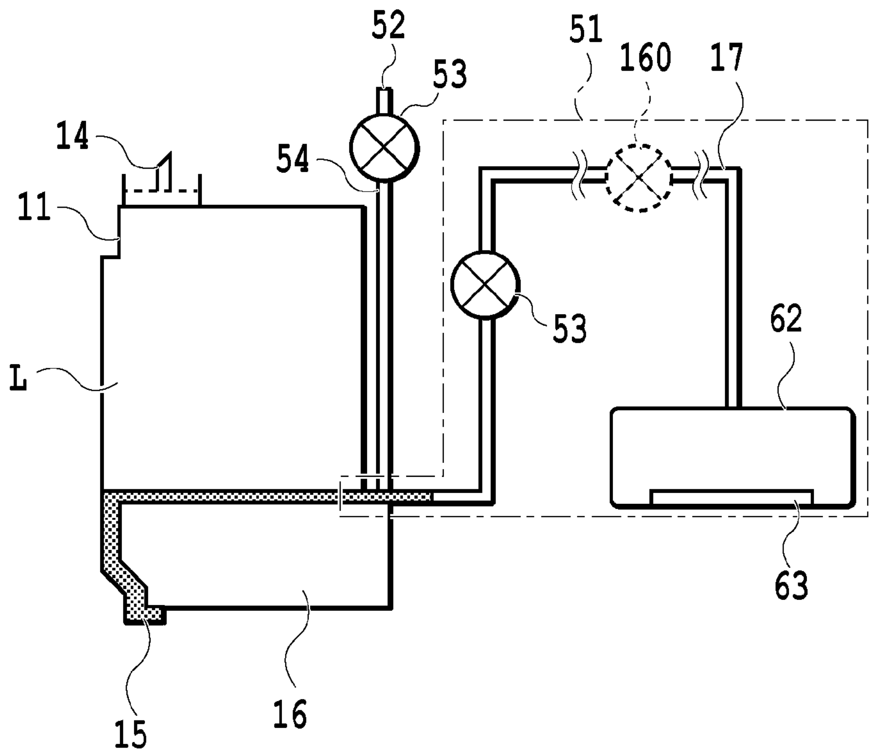
FIGS. 4A and 4B are schematic diagrams showing states of the ink tank and the print head.
Figure 4B:
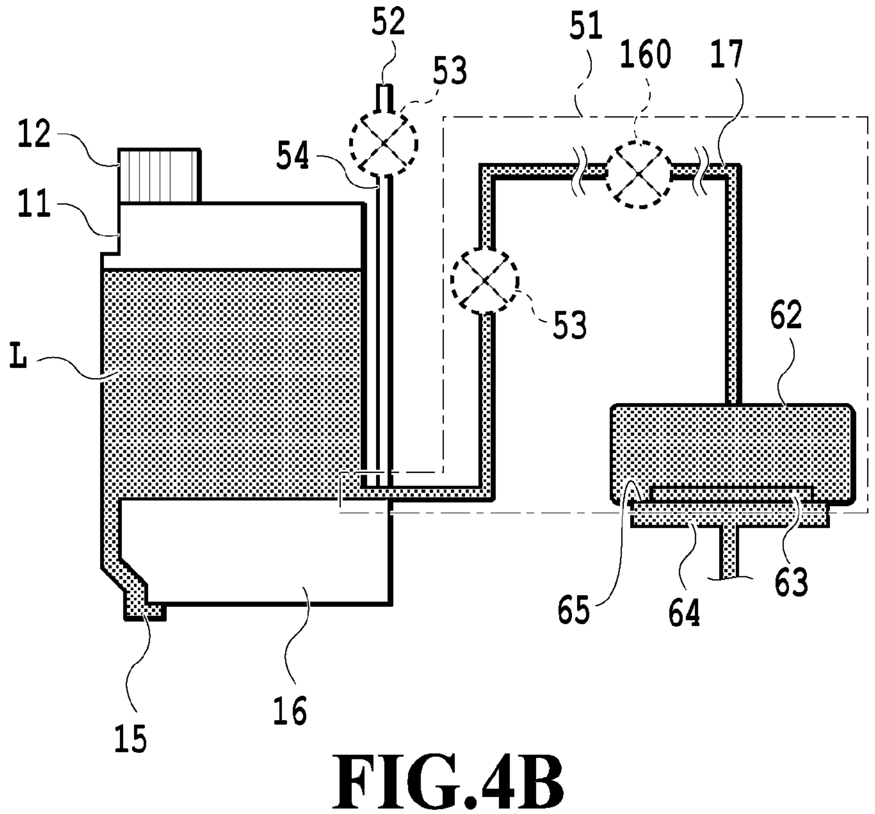

As shown in FIG. 3A, the printing apparatus 100 includes a third cover member 41, which is provided with a mechanism for reading an image on a loaded original document and is pivotally supported by the printing apparatus 100 in an openable and closable manner. Note that the third cover member 41 may be a reading mechanism to read the image on the original, or may be an access cover constituting an external upper surface which exposes part of internal components of the printing apparatus 100 in order to remove the print medium that causes a transportation failure in the course of image printing. The ink tank 11 is installed on a front surface side (+y direction side) of the printing apparatus 100 so that the user can easily inject the ink into the ink tank 11. As described above, the four ink tanks 11 in total, namely, the three color ink tanks 111 and the black ink tank 112 are provided in present embodiment. However, the types and the number of the ink tanks 11 are not limited to this example. For instance, more than four ink tanks 11 may be provided in order to improve quality of image printing on the print medium.

Figure 3B:
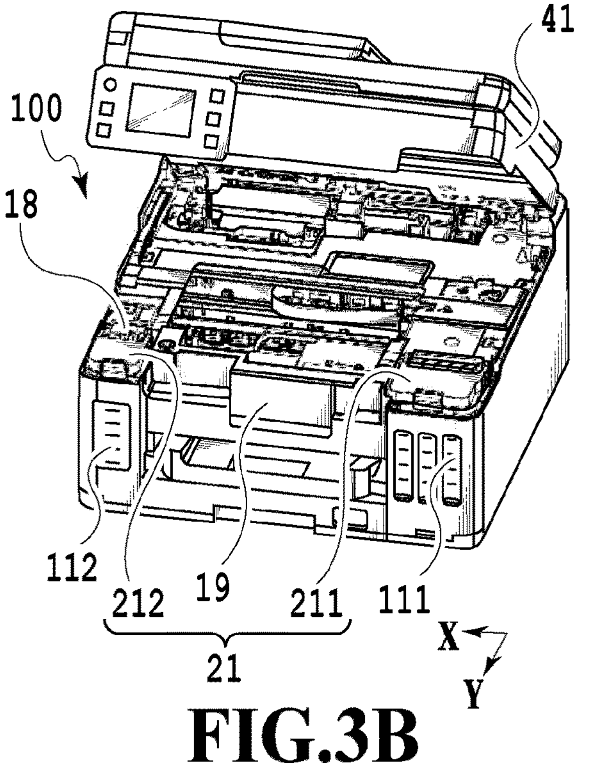

In the case where the user injects the ink into the ink tank 11, the user first turns the third cover member 41 upward and sets the third cover member 41 to the open state as shown in FIG. 3B. As the third cover member 41 is turned by a predetermined amount, the open state of the third cover member 41 can be maintained by use of a lock mechanism (not shown). Here, a cover sensor 18 is installed at a housing 19 and is capable of detecting the open state or the closed state of the third cover member 41. The cover sensor 18 is not limited to a mechanical sensor designed to detect mechanical contact. The cover sensor 18 may be may be an optical sensor, for example. Here, it is possible to release the lock mechanism by further turning the third cover member 41 upward. This action makes it possible to close the third cover member 41. By opening the third cover member 41, the internal components of the printing apparatus 100 are exposed and the user can operate a second cover member 21 (see FIGS. 3B and 1).

The second cover member 21 is pivotally supported in such a way as to be movable between a position to fall forward (a closed lid position) and a position to be lifted up (an open lid position). The ink tanks 11 are provided with the second cover members 21, respectively. To be more precise, the black ink tank 112 is covered with a black second cover member 212 and the three color ink tanks 111 are integrally covered with a single color second cover member 211. The black second cover member 212 and the color second cover member 211 will be collectively referred to as the second cover member 21. Although the black second cover member 212 and the color second cover member 211 are formed into different shapes in present embodiment, these cover members may be formed into the same shape instead.

Figure 3C:
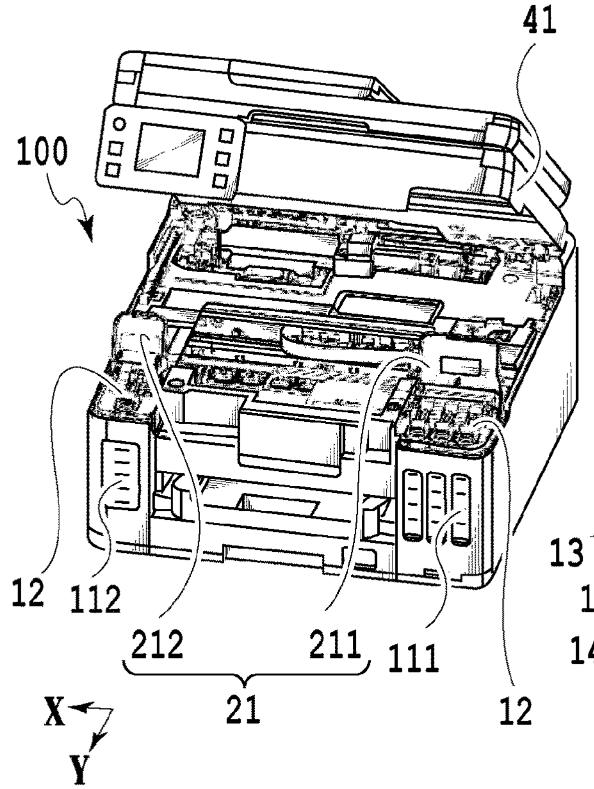
Figure 3D:
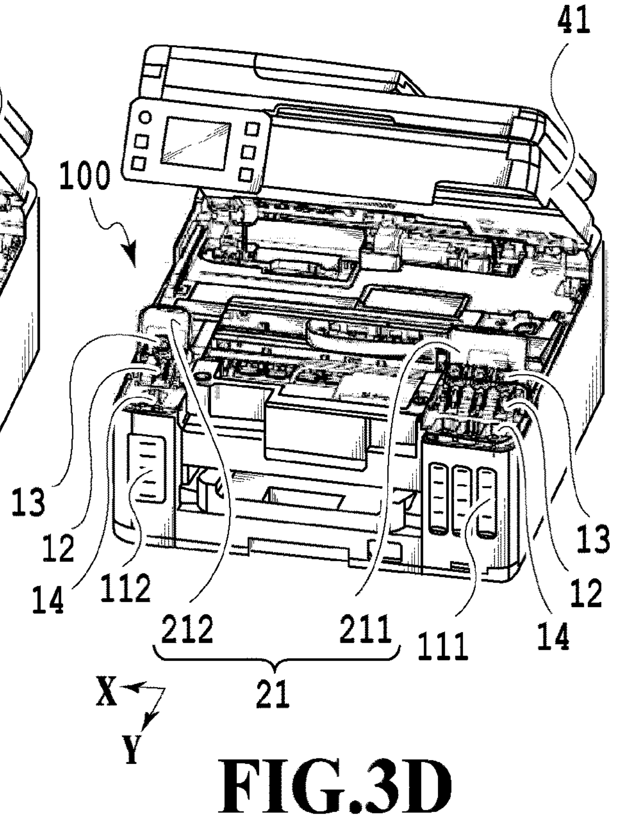

A first cover member 12 to close the ink tank 11 appears in the case where the user operates the second cover member 21 from the closed lid position to the open lid position (see FIGS. 1, 3C, and 4B). The first cover member 12 is pivotally supported in such a way as to be movable between a position to close the ink tank 11 (a closed tap position) and a position to be lifted up (an open tap position). An injection port 14 provided at an upper part of the ink tank 11 for user in injecting the ink appears in the case where the user operates the first cover member 12 from the closed tap position to the open tap position (see FIGS. 3D and 4A).

The first cover member 12 is provided with a seal member 13 formed from an elastic body such as rubber. By operating the first cover member 12 to the closed tap position, the seal member 13 closes the injection port 14 so as to prevent the leakage of the ink contained in the ink tank 11. In the present embodiment, the valve unit 53 acts in conjunction with the operation to lift the first cover member 12, thus closing the ink supply channel 51 and the atmospheric communicating channel 54, respectively (FIG. 4A).

The user can inject the ink into the ink tank 11 by putting a container (not shown) containing the ink into the injection port 14. After the injection of the ink is completed, the user operates the first cover member 12 to the closed tap position again. The valve unit 53 acts in conjunction with this operation, thus opening the ink supply channel 51 and the atmospheric communicating channel 54, respectively (see FIG. 4B). Thereafter, the user operates the second cover member 21 to the closed lid position, thus closing the third cover member 41. The printing apparatus 100 can detect the closure of the third cover member 41 by using the cover sensor 18 configured to detect the position of the third cover member 41. Upon detection of the closure of the third cover member 41, the printing apparatus 100 brings the suction cap 65 into contact with the print head 62 as shown in FIG. 4B in order to fill the ink supply channel 51 with an ink L inside the ink tank 11. Then, the ink suction mechanism 64 carries out a suctioning operation to suction the ink L from the ink ejection ports 63. The supply tube 17 constituting the ink supply channel 51 is filled with the ink as a consequence of this suctioning operation. Moreover, it is possible to conduct the suctioning operation while applying a larger negative pressure to the ink ejection ports 63 by carrying out on-off control of the on-off valve mechanism 160 at the time of this suctioning operation. To be more precise, the suction pump of the ink suction mechanism 64 is driven in the state of capping the print head 62 with the suction cap 65 while closing the on-off valve mechanism 160. In this way, the negative pressure is charged between the on-off valve mechanism 160 and the ink ejection ports 63 of the print head 62. Then, as the suction pump is stopped and the on-off valve mechanism 160 is opened, the print head 62 is filled with the ink by means of the charged negative pressure. In the meantime, the on-off valve mechanism 160 also has a role in closing the ink supply channel 51 so as to block the ink leakage in the case of moving the printing apparatus 100.

As described above, the ink supply channel 51 is provided with the two types of the valves in the present embodiment, namely, the valve unit 53 and the on-off valve mechanism 160, which have the functions independent of and different from each other. Specifically, the valve unit 53 closes the ink supply channel 51 in the case of filling the ink tank 11 with the ink and opens the ink supply channel 51 in other cases. On the other hand, the on-off valve mechanism 160 closes the ink supply channel 51 in order to suppress the ink leakage or in the case of conducting efficient suctioning at the time of filling the ink. Details of the on-off valve mechanism 160 will be described later.

In the state filled with the ink as described above, as the ink is ejected from the ink ejection ports 63 in the case of printing an image on the print medium, for example, the ink is supplied from the ink tank 11 to the print head 62 in an amount equivalent to an amount of the ink discharged from the print head 62. The ink is continuously supplied from the ink tank 11 to the print head 62 until the ink in the ink tank 11 falls below a predetermined amount.

The above-described example has explained the case where the user conducts the opening and closing operations by operating the first cover member 12, the second cover member 21, and the third cover member 41. Instead, the opening and closing operations may be carried out automatically by means of control inside the printing apparatus 100.

<Ink Filling Sequence>

Figure 5:
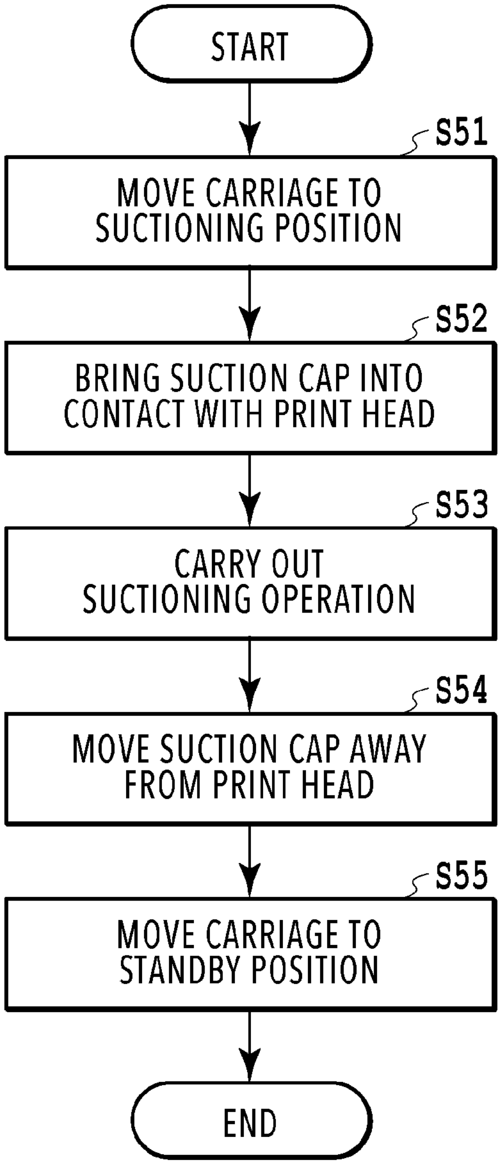
FIG. 5 is a flowchart of an ink filling sequence.

FIG. 5 is a flowchart of an ink filling sequence. In the case where the ink filling sequence is started, the printing apparatus 100 moves the carriage 61 that holds the print head 62 to a suctioning position opposed to the suction cap 65 in S51 to begin with. In S52, the printing apparatus 100 brings the suction cap 65 into contact with the print head 62. In S53, the printing apparatus 100 carries out the suctioning operation to suction the ink from the ink ejection ports 63 of the print head 62 by using the suction cap 65. In this instance, the suctioning operation may be carried out together with the on-off control of the on-off valve mechanism 160 as discussed earlier. After the completion of the suctioning operation, the printing apparatus 100 moves the suction cap 65 away from the print head 62 in S54. Then, in S55, the printing apparatus 100 moves the carriage 61 from the suctioning position to a standby position. Thus, the operations of the series of the ink filling sequence are terminated.

<Block Diagram>

Figure 6:
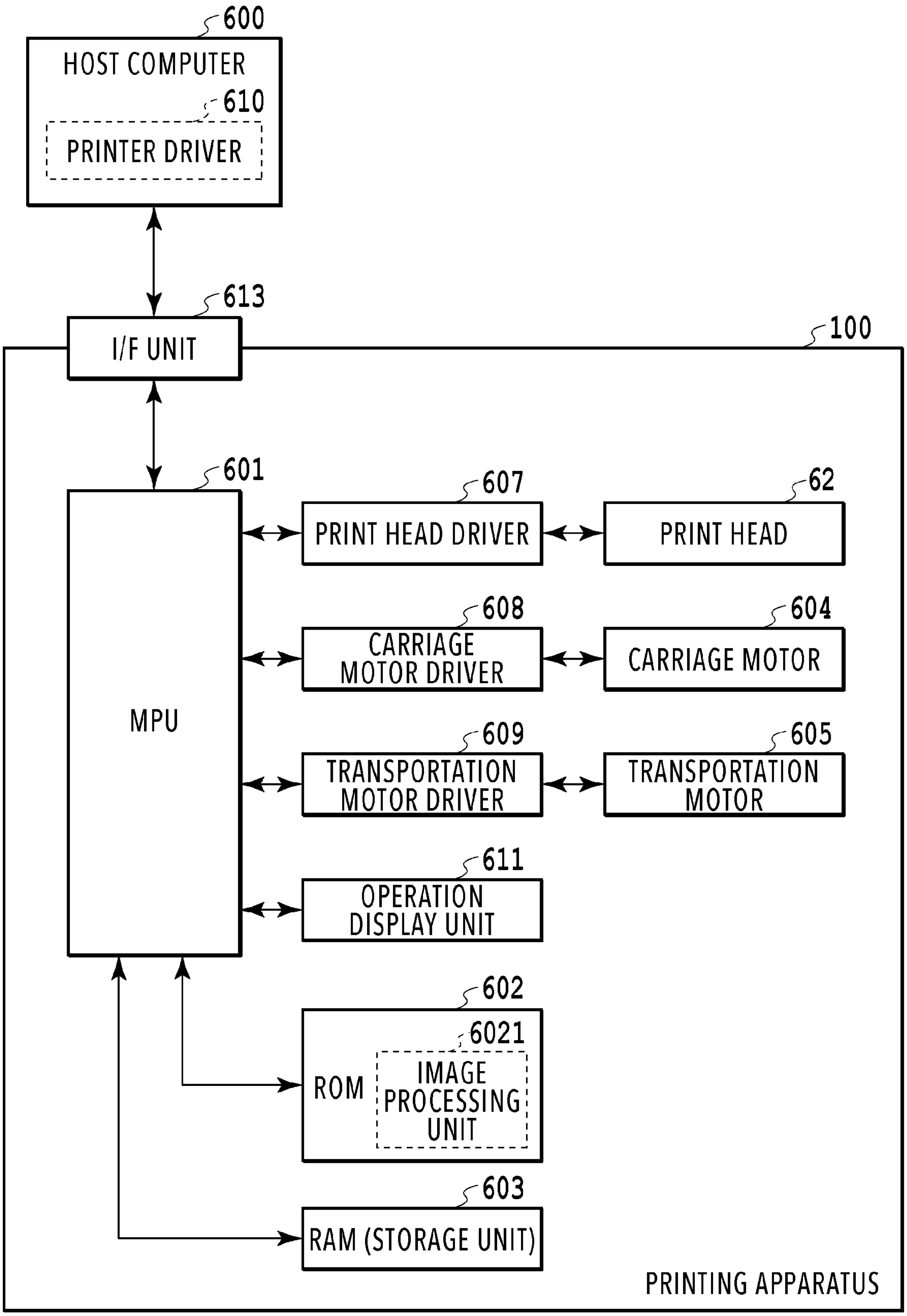
FIG. 6 is a block diagram including a configuration of the printing apparatus.

FIG. 6 is a block diagram including a configuration of the printing apparatus 100 according to the present embodiment. The printing apparatus 100 includes the print head 62, an MPU 601, a ROM 602, a RAM 603, a carriage motor 604, a transportation motor 605, a print head driver 607, a carriage motor driver 608, a transportation motor driver 609, and an I/F unit 613. A program that functions as an image processing unit 6021 is stored in the ROM 602.

The MPU 601 controls operations of the respective units, data processing, and the like. The ROM 602 stores programs and data to be executed by the MPU 601. The RAM 603 temporarily stores processing data to be executed by the MPU 601 and data received from a host computer 600. The print head 62 is controlled by the print head driver 607. The carriage 61 is driven by the carriage motor 604. The carriage motor 604 is controlled by the carriage motor driver 608. The feeding rollers, the transportation rollers, and the discharge rollers are driven by the transportation motor 605. The transportation motor 605 is controlled by the transportation motor driver 609. The host computer 600 includes a printer driver 610 for processing print information such as a printed image and image quality and for communicating with the printing apparatus 100 in the case where the user issues a command to execute a printing operation. The MPU 601 exchanges printed images and the like with the host computer 600 through the I/F unit 613.

<Configuration of On-Off Valve Mechanism>

Figure 7A:
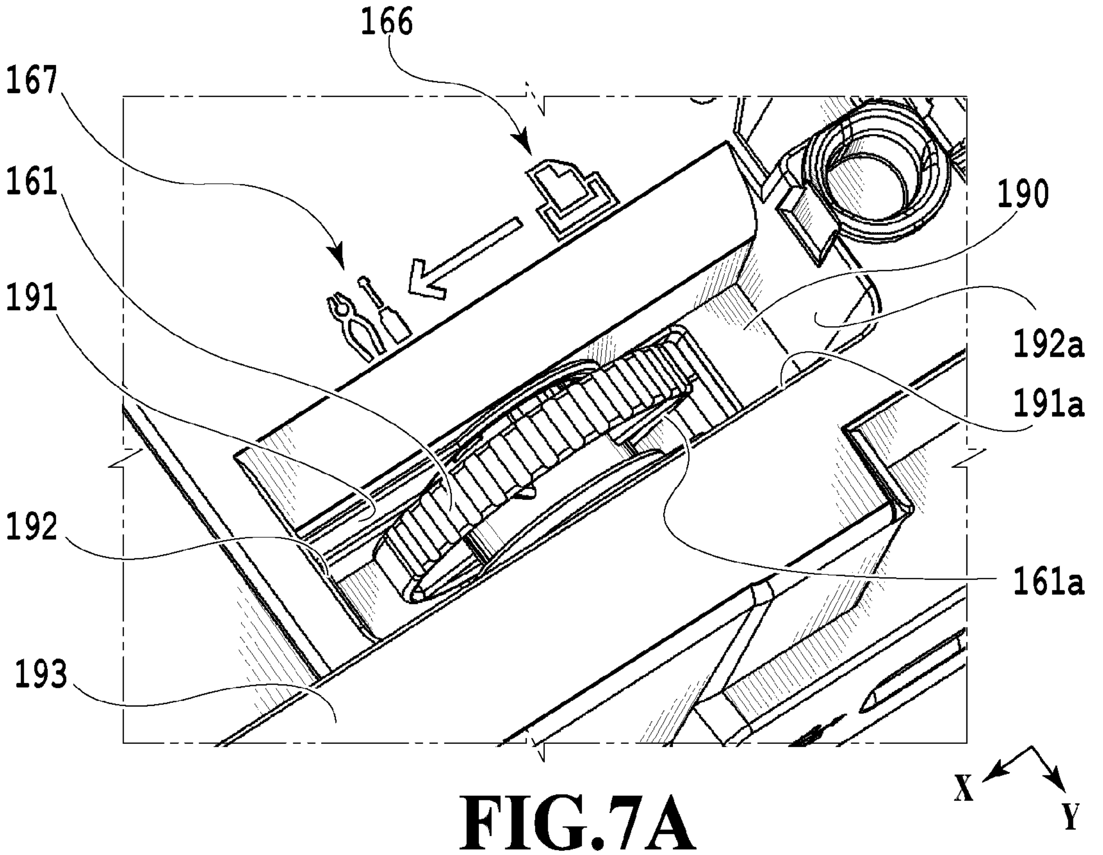
FIGS. 7A and 7B are perspective views of an operating unit in an on-off valve mechanism.
Figure 7B:
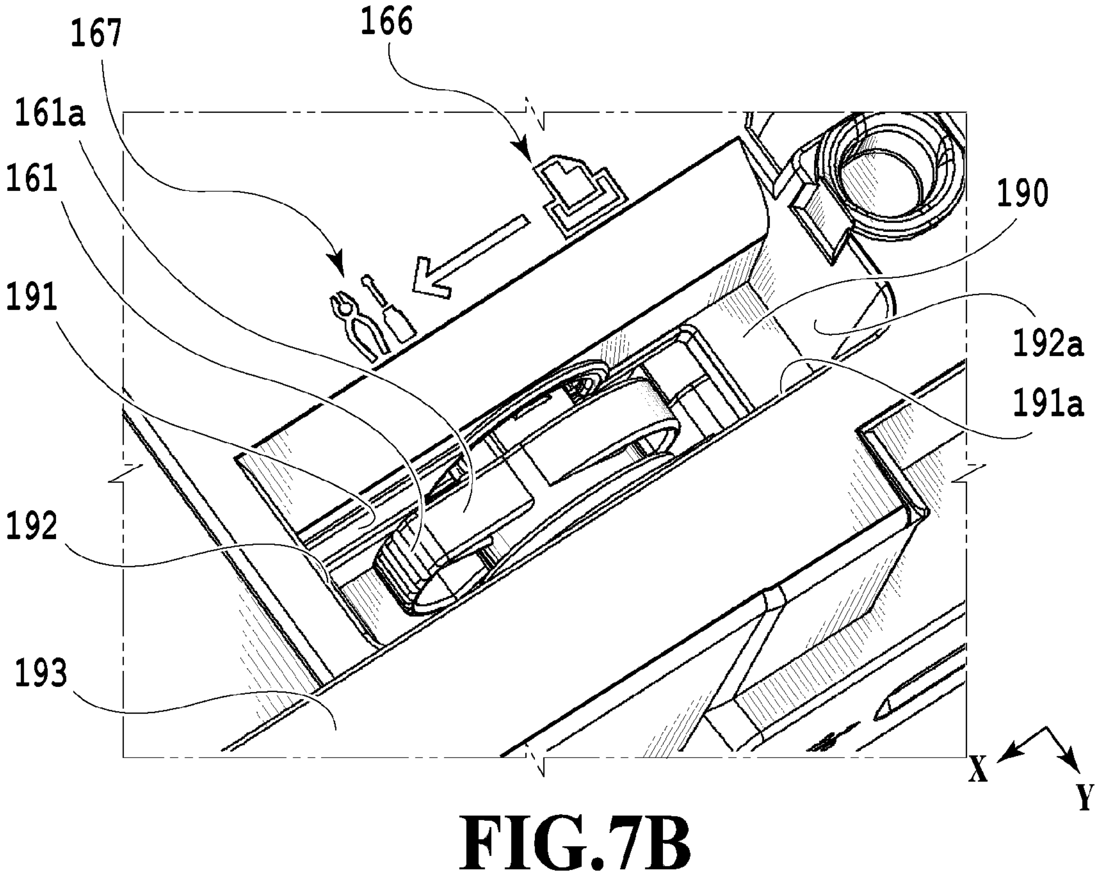
Figure 8:
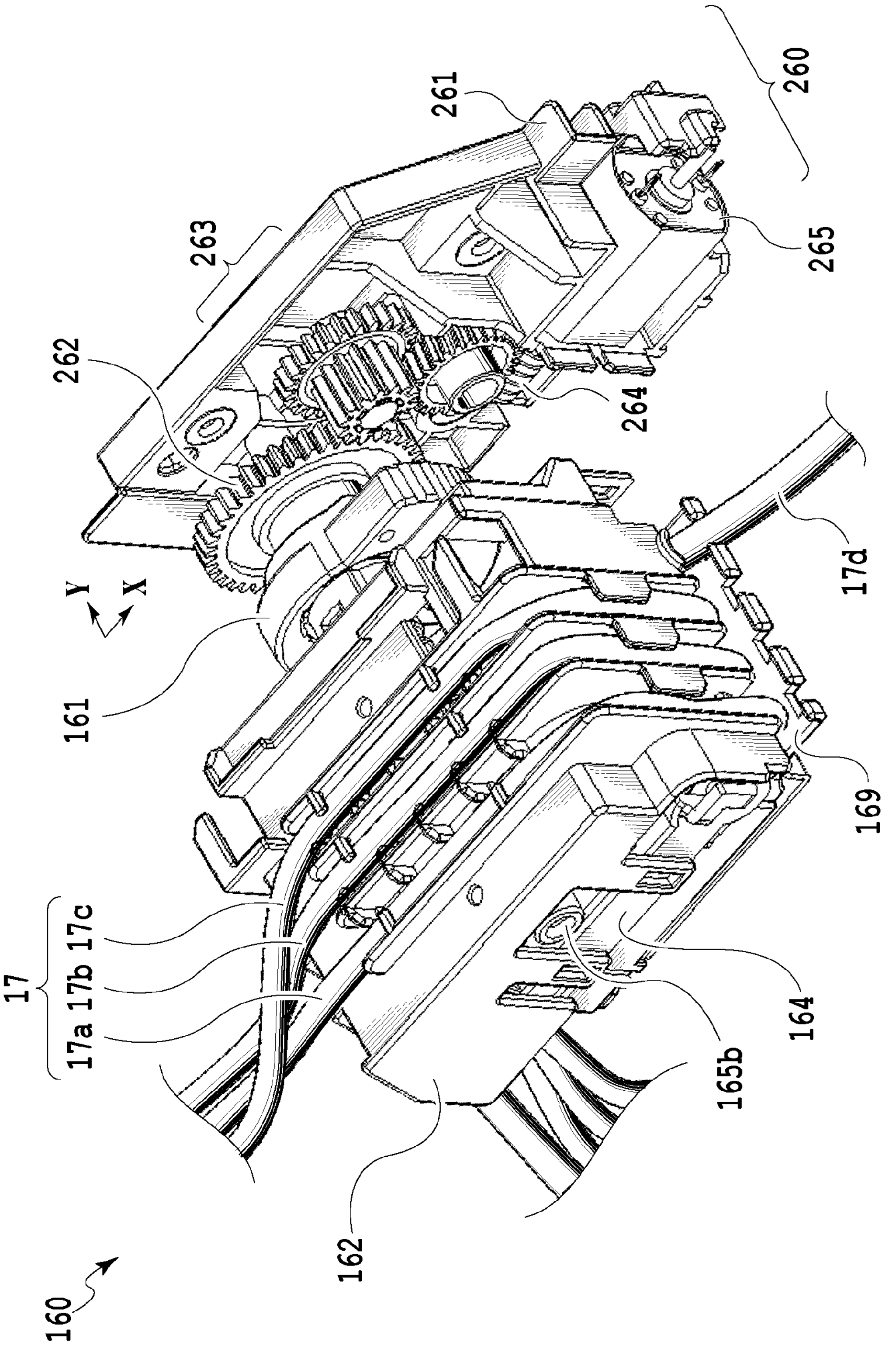
FIG. 8 is a perspective view showing an outline of the on-off valve mechanism.
Figure 9A:
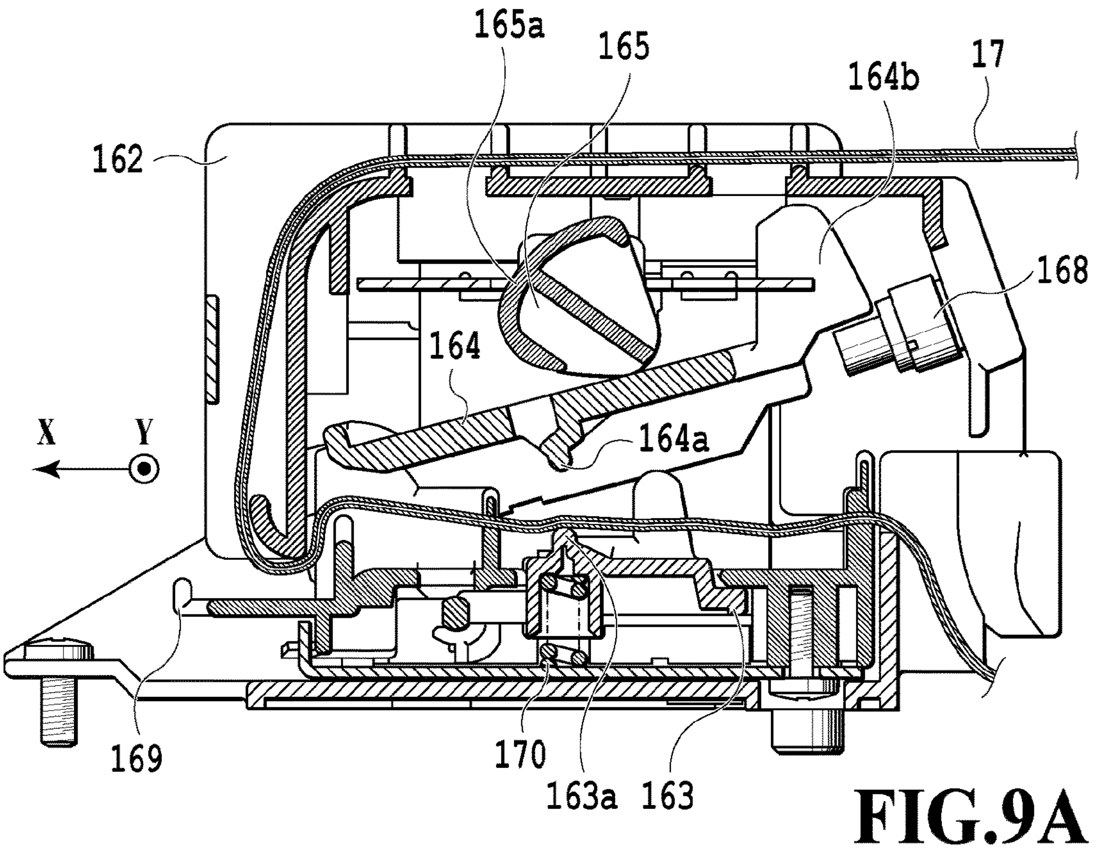
FIGS. 9A and 9B are cross-sectional views showing the outline of the on-off valve mechanism.
Figure 9B:
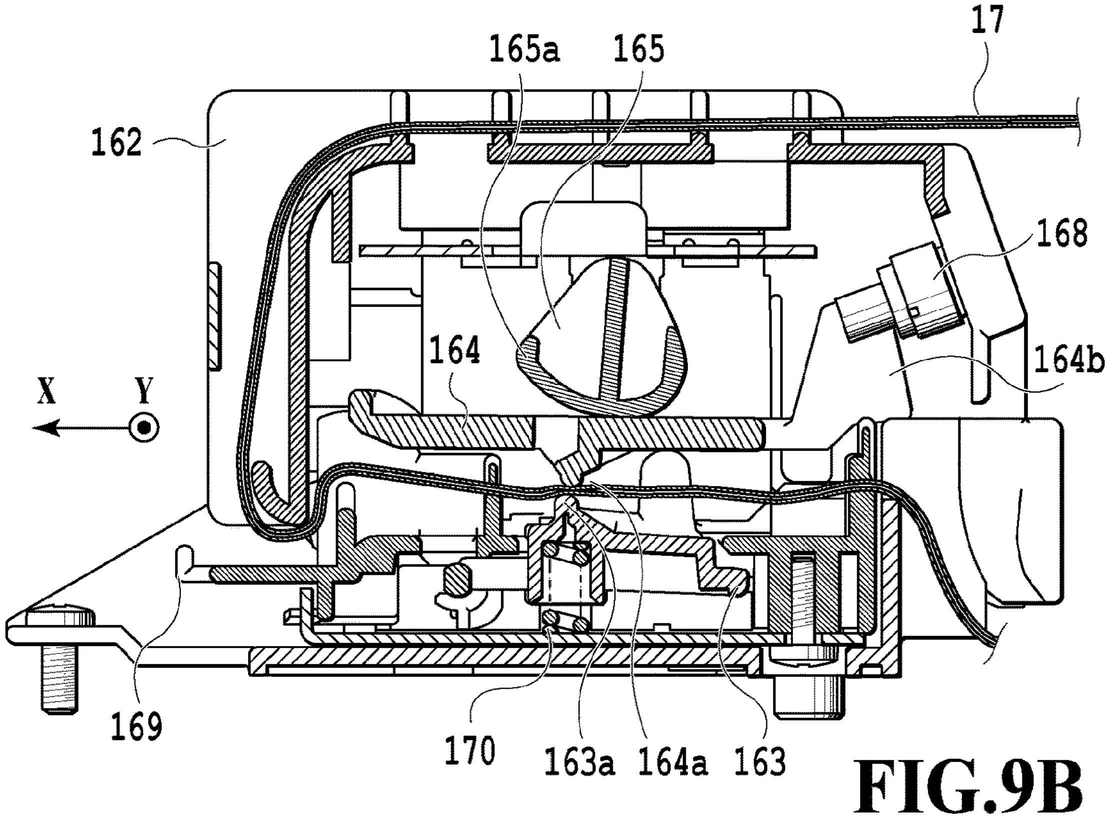
Figure 10A:
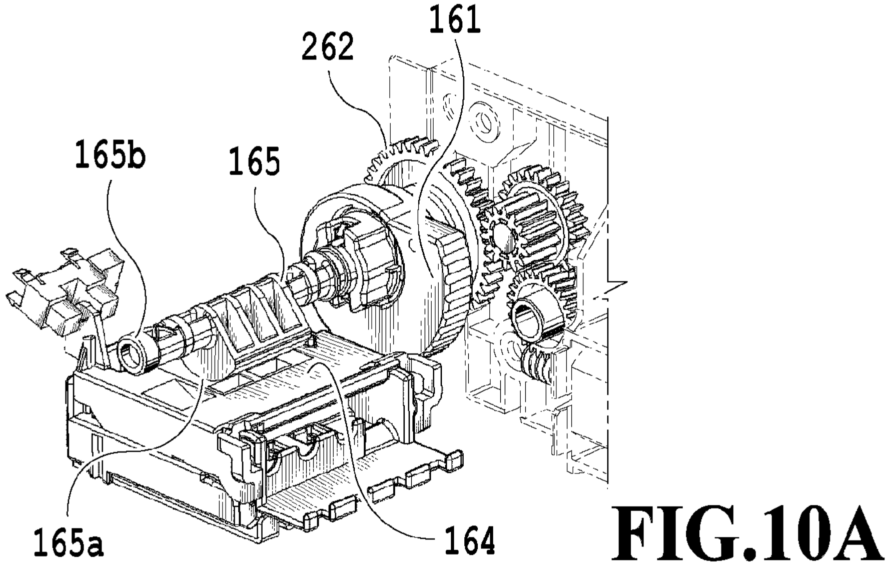
FIGS. 10A to 10C are perspective views of the on-off valve mechanism in a state of removing a cover member therefrom.
Figure 10B:
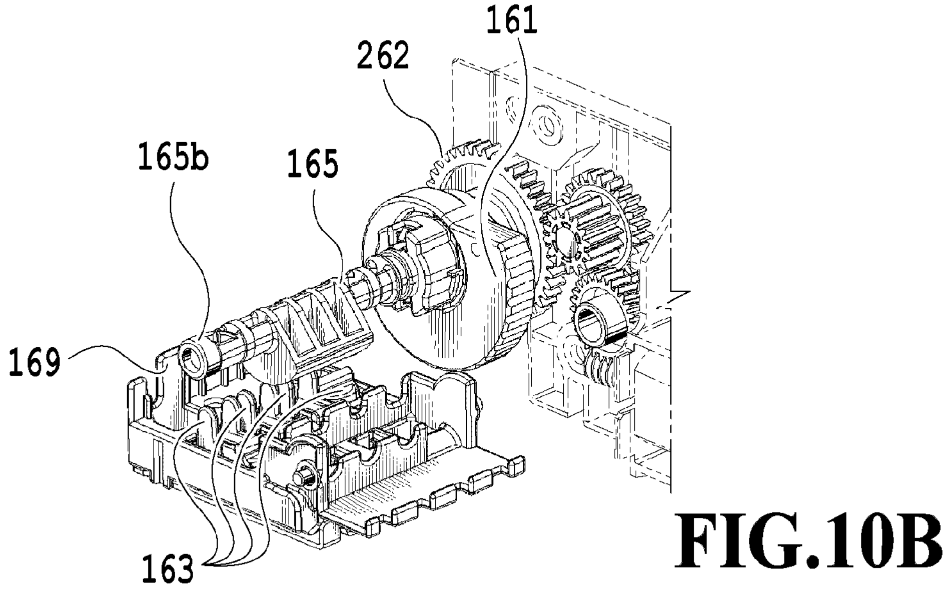
Figure 10C:
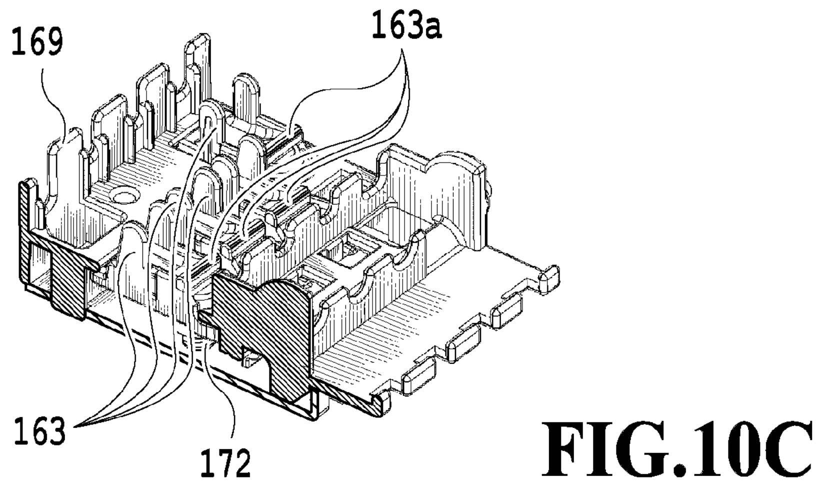
Figure 11:
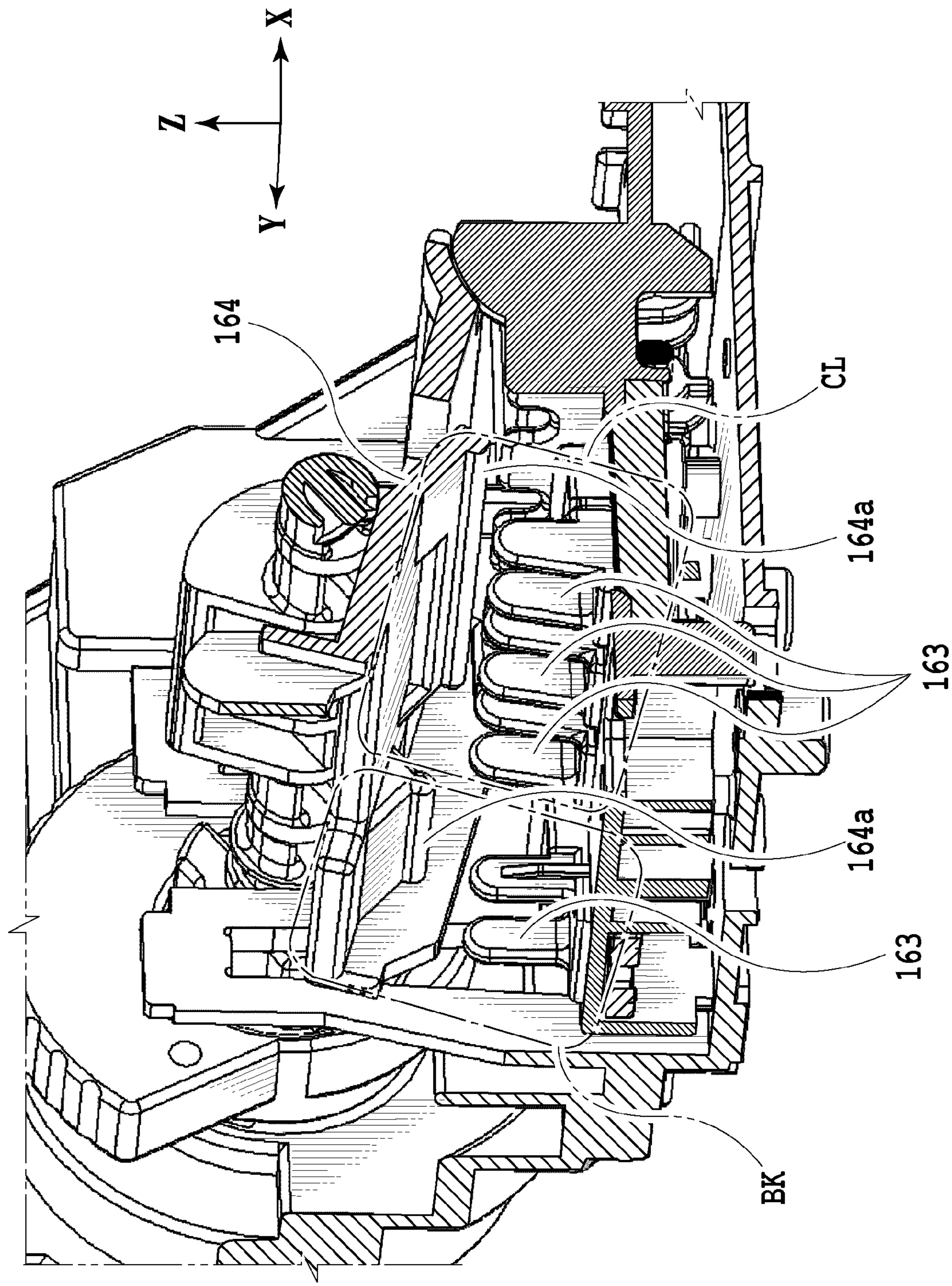
FIG. 11 is a perspective view of the on-off valve mechanism.

Next, a description will be given of a configuration and operations of the on-off valve mechanism 160 according to the present embodiment. FIGS. 7A and 7B are perspective views of an operating unit 161 in the on-off valve mechanism 160 according to the present embodiment. FIG. 8 is a perspective view showing an outline of the on-off valve mechanism 160 according to the present embodiment. FIGS. 9A and 9B are cross-sectional views showing the outline of the on-off valve mechanism 160 according to the present embodiment. FIGS. 10A to 10C are perspective views of the on-off valve mechanism 160 in a state of removing a cover member 162 therefrom. FIG. 11 is a perspective view of the on-off valve mechanism 160 from a different viewpoint from that of FIG. 8. The following description will be given mainly with reference to FIGS. 7A to 11 as appropriate.

As described above, the on-off valve mechanism 160 is the valve for closing and opening (establishing communication of) the ink supply channel 51 formed from the supply tube 17. As shown in FIGS. 1, 7A, 7B, and 8, the on-off valve mechanism 160 includes the operating unit 161 which is manually operable by the user. The operating unit 161 is configured to enable the user to perform a rotating operation by using an operating surface 161*a*. The on-off valve mechanism 160 is disposed at the ink supply channel 51 and is capable of switching between an open state to establish communication between the ink tank 11 and the print head 62 and a closed state to block the communication by operating the operating unit 161. Moreover, as shown in FIGS. 7A and 7B, a print mark 166 and a maintenance mark 167 are drawn at operating positions of the operating unit 161 so as to enable the user to intuitively recognize on-off states of a valve in the on-off valve mechanism 160. In the case where the operating surface 161*a* of the operating unit 161 is located at the position of the print mark 166, the on-off valve mechanism 160 is not closing the ink supply channel 51 and is therefore in the state where the ink can be supplied from the ink tank 11 to the print head 62. In other words, the printing apparatus 100 is in a state of being capable of printing on the print medium. On the other hand, the on-off valve mechanism 160 closes the ink supply channel 51 in the case where the operating unit 161 is rotated from the position of the print mark 166 to the maintenance mark 167 and the operating surface 161*a* is located on the side indicated with the maintenance mark 167. As a consequence, the ink is not supplied from the ink tank 11 to the print head 62. Accordingly, the user can perform an operation to replace the print head 62 or an operation to transport the printing apparatus 100 in the state of suppressing the movement of the ink in the ink supply channel 51. Meanwhile, it is possible to carry out initial filling of the print head 62 with the ink or an operation to remove bubbles from the ink supply channel 51 efficiently by conducting the above-described suctioning operation in the closed state of the ink supply channel 51 with the on-off valve mechanism 160.

The on-off valve mechanism 160 according to the present embodiment enables opening and closing operations manually and automatically by coupling a driving unit thereto. Here, the driving unit can be electrically driven by an external power supply. In other words, the operating unit 161 can switch between the open state and closed state by driving the external driving unit in addition to the manual operation of the user. Details of this configuration will be described later.

As shown in FIG. 3B, the printing apparatus 100 includes the housing 19. Moreover, as shown in FIGS. 7A and 7B, the housing 19 includes an opening portion 190. The operating unit 161 is disposed in the opening portion 190. The opening portion 190 is formed in the housing 19 by using a first wall 191, a second wall 192, and opposed surfaces 191*a* and 192*a* which are opposed to the first wall 191 and the second wall 192, respectively. Meanwhile, the opening portion 190 is disposed at a position lower in a direction of gravitational force than a third wall 193 that constitutes part of the housing 19. In other words, the operating unit 161 is disposed at a recessed portion in the housing 19 where an upper surface portion is open. Accordingly, it is possible to restrict a direction of access of the user to the operating unit 161 only to the direction of gravitational force, thereby reducing erroneous operations by the user.

Meanwhile, since the cover sensor 18 (FIG. 3B) is provided in the present embodiment, the printing apparatus 100 can detect by using the cover sensor 18 as to whether or not the operating unit 161 is in a state operable by the user.

In addition to the operating unit 161 operable by the user, the on-off valve mechanism 160 includes the cover member 162, a receiving member 163, a displacement member 164, a cam 165, a holding member 169, and a driving mechanism 260 as shown in FIGS. 8 to 11. FIG. 9A shows the open state of the on-off valve mechanism 160 and FIG. 9B shows the closed state of the on-off valve mechanism 160. FIG. 10A is a diagram showing a state after removing the cover member 162 that appears in FIG. 8. FIG. 10B is a diagram showing a state after removing the displacement member 164 that appears in FIG. 10A. FIG. 10C is a diagram showing a state after removing the receiving member 163 that appears in FIG. 10B.

The cover member 162 and the holding member 169 hold the supply tubes 17 as shown in FIGS. 8 to 9B. One end of each supply tube 17 is connected to the print head 62 while the other end thereof is connected to the corresponding ink tank 11. The supply tube 17 includes a bending region which is bendable along with the movement of the print head 62. The on-off valve mechanism 160 is arranged such that the bendable region of the supply tube 17 is located between the print head 62 and the cover member 162. In other words, the on-off valve mechanism 160 is disposed at a region of each supply tube 17 which does not move along with the movement of the carriage 61.

As shown in FIGS. 9A, 9B, and 11, the displacement member 164 is a member which is provided with a pressing portion 164*a* that presses the supply tubes 17 and is deformable in a direction to interfere with the supply tubes 17. In other words, the displacement member 164 is provided in such a way as to be capable of advancing and retracting to and from the supply tubes 17. The receiving member 163 is a member for receiving the displacement member 164 that is displaced in the direction to interfere with the supply tubes 17, and includes a contact portion 163*a*. In the meantime, a first biasing member 170 biases the receiving member 163 toward the holding member 169. The receiving member 163 is provided on an opposite side to a portion provided with the displacement member 164 in light of the supply tubes 17. Moreover, the pressing portion 164*a* of the displacement member 164 presses the supply tubes 17 against the contact portion 163*a* of the receiving member 163 and crushes the supply tubes 17, thereby closing the ink supply channels 51. Thus, the on-off valve mechanism 160 goes into the closed state.

As shown in FIGS. 8 to 10C, the cam 165 includes a cam surface 165*a* and a cam shaft 165*b*. The cam 165 is rotated by being engaged with the operating unit 161, thus displacing the displacement member 164. In the case of the present embodiment, the cam 165 is provided separately from the operating unit 161 as shown in FIGS. 10A to 10C. Instead, the cam 165 and the operating unit 161 may be integrated with each other. As shown in FIGS. 9A and 9B, the cam 165 is configured such that the cam surface 165*a* comes into contact with the displacement member 164. In the case where the user operates the operating unit 161, the cam 165 is rotated around the cam shaft 165*b* along with the operation, and the displacement member 164 pushed by the cam surface 165*a* is displaced accordingly. In this way, the user can close or establish communication of the ink supply channels 51 through the operating unit 161.

As shown in FIG. 8, the driving mechanism 260 includes a driving mechanism holding unit 261, a drive transmission gear 262 which is a drive transmission unit to transmit the drive to the operating unit 161, an intermediate gear train 263, and a motor 265. The driving mechanism holding unit 261 includes the drive transmission gear 262, the intermediate gear train 263, and the motor 265. The motor 265 includes a motor gear 264. The drive transmission gear 262 includes an engagement portion 262*a* (see FIGS. 12A to 13B) to be engaged with the operating unit 161. A driving force is transmitted from the motor 265 connected to the external power supply (not shown) to the drive transmission gear 262 through the intermediate gear train 263, which rotates the operating unit 161 engaged therewith. Thus, it is possible to close and establish communication of the ink supply channels 51 automatically by displacing the displacement member with the cam 165. Here, it is possible to control a direction of drive transmission in one direction from the motor 265 side to the operating unit 161 side by using a worm gear for the motor gear 264 as in the present embodiment. However, the motor gear 264 is not limited only to the worm gear and other publicly known gears may be used instead. In the present embodiment, the center of rotation of the drive transmission gear 262 is located substantially coaxially with the center of rotation of the operating unit 161. In this way, it is possible to reduce a component size and thus to downsize the apparatus. However, the center of rotation of the drive transmission gear 262 does not always have to be located coaxially with the center of rotation of the operating unit 161.

Figure 12A:
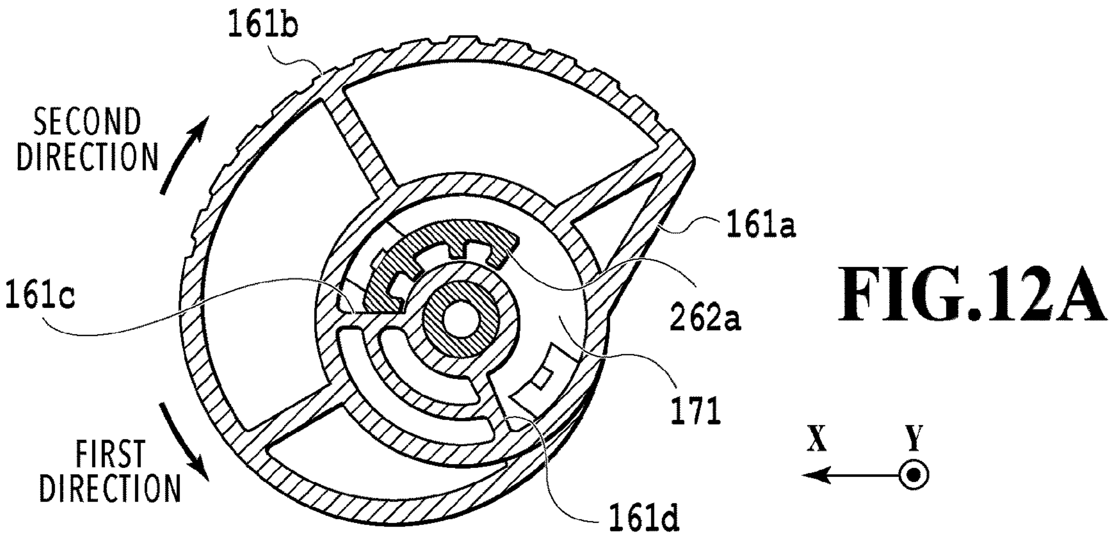
FIGS. 12A to 12C are cross-sectional views of the operating unit and an engagement portion of a drive transmission gear.
Figure 12B:
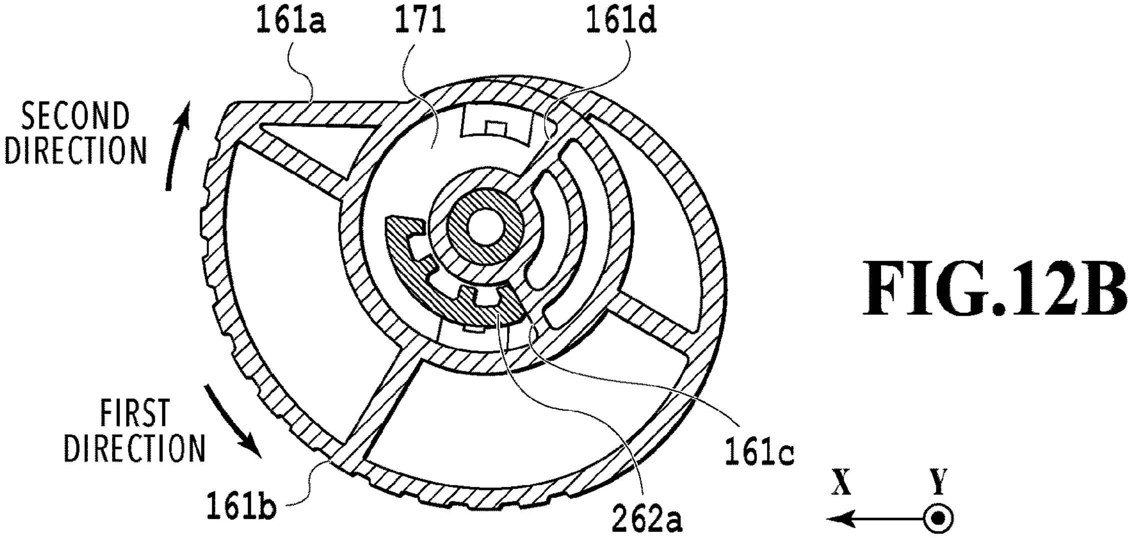

Next, a description will be given of an operation by the on-off valve mechanism 160 according to the present embodiment to close each supply tube 17. FIG. 9A shows the state (the open state) in which the displacement member 164 does not crush the supply tube 17 and the ink supply channel 51 establishes communication. In this open state, the ink in the supply tube 17 can be supplied from the ink tank 11 to the print head 62 through the ink supply channel 51. In this instance, the operating surface 161*a* of the operating unit 161 is located on the side indicated with the print mark 166 as shown in FIGS. 7A and 12A. The user conducts a rotating operation of the operating unit 161 by accessing the operating surface 161*a* with a finger. Alternatively, the rotating operation of the operating unit 161 is carried out automatically as discussed earlier. The rotating operation is conducted either manually or automatically such that the operating surface 161*a* of the operating unit 161 in the open state is rotated to the side indicated with the maintenance mark 167 as shown in FIGS. 7B and 12B. Then, the cam surface 165*a* of the cam 165 provided in such a way as to be rotated in response to the rotating operation of the operating unit 161 is also rotated as shown in FIG. 9B. Thereafter, the cam surface 165*a* displaces the displacement member 164 in the direction to interfere with the supply tube 17.

FIG. 9B shows the state (the closed state) in which the displacement member 164 crushes the supply tube 17 and the ink supply channel 51 is closed. As shown in FIG. 9B, the supply tube 17 is crushed between the displacement member 164 and the receiving member 163 whereby the ink supply channel 51 is closed. In this instance, the supply tube 17 is in a state of being unable to supply the ink in the ink tank 11 to the print head 62 and in a state of not permitting the flow of the air therein.

Here, as shown in FIGS. 10C and 11, the present embodiment provides a plurality of the receiving members 163 corresponding to the supply tubes 17 for the respective ink colors, and also provides a plurality of the contact portions 163*a* corresponding to the supply tubes 17 for the respective ink colors. In the present embodiment, the single common member is provided as the displacement member 164. Meanwhile, two pressing portions 164*a* on the black side (BL) and the color side (CL) are provided as shown in FIG. 11. Moreover, it is possible to close the ink supply channels 51 individually by causing the contact portions 163*a* for the respective supply tubes 17 and the pressing portions 164*a* of the displacement member 164 to crush the respective supply tubes 17 individually. As described above, the present embodiment is configured to close both the black on-off valve mechanism 160 and the color on-off valve mechanism 160 by displacing the displacement member 164 in the direction to interfere with the supply tubes 17. However, the present invention is not limited only to this configuration.

Meanwhile, the present embodiment describes the example in which the cam 165 that displaces the displacement member 164 and the operating unit 161 for rotating the cam 165 use the single member in common for the black ink and the color inks. However, the present invention is not limited only this configuration. The above-described members constituting the on-off valve mechanism 160 may be appropriately prepared to form the on-off valve mechanisms 160 for the respective ink colors. Alternatively, the common on-off valve mechanism 160 may be provided for all the colors.

Meanwhile, as shown in FIGS. 9A and 9B, the on-off valve mechanism 160 is provided with an on-off valve sensor 168 for detecting an on-off state of the on-off valve mechanism 160. In the present embodiment, the on-off valve sensor 168 is a switch that is activated in a contactless manner. In the case where the operating unit 161 is operated manually or automatically, a detection target portion 164*b* provided to the displacement member 164 passes by a detection unit of the on-off valve sensor 168 and the on-off valve sensor 168 is activated. Thus, the on-off valve sensor 168 can detect the closed state and the open state of the on-off valve mechanism 160. Here, the on-off valve sensor 168 may adopt a contact sensor or any other publicly known structures instead.

In the meantime, a variety of control may be carried out by interlocking the on-off valve sensor 168 and the cover sensor 18. For example, there may be a case in which the cover sensor 18 detects the open state of the third cover member 41 and then the on-off valve sensor 168 detects the closed state in a case of detection of the closed state of the third cover member 41. This may possibly be the case where the closed state is brought about by the manual operation of the user, for instance. In this case, the printing apparatus 100 may be used in the closed state of the supply tube 17. Accordingly, error notification may be displayed on an operation display unit 611 or a variety of initialization processing may be carried out.

<Automatic and Manual Operations of On-Off Valve Mechanism>

Figure 12C:
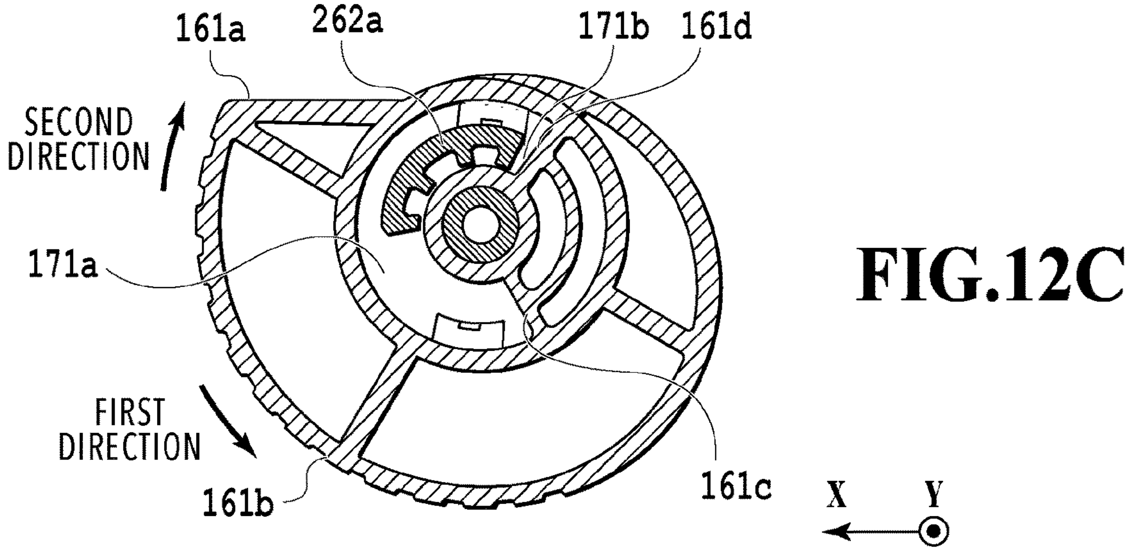
Figure 13A:
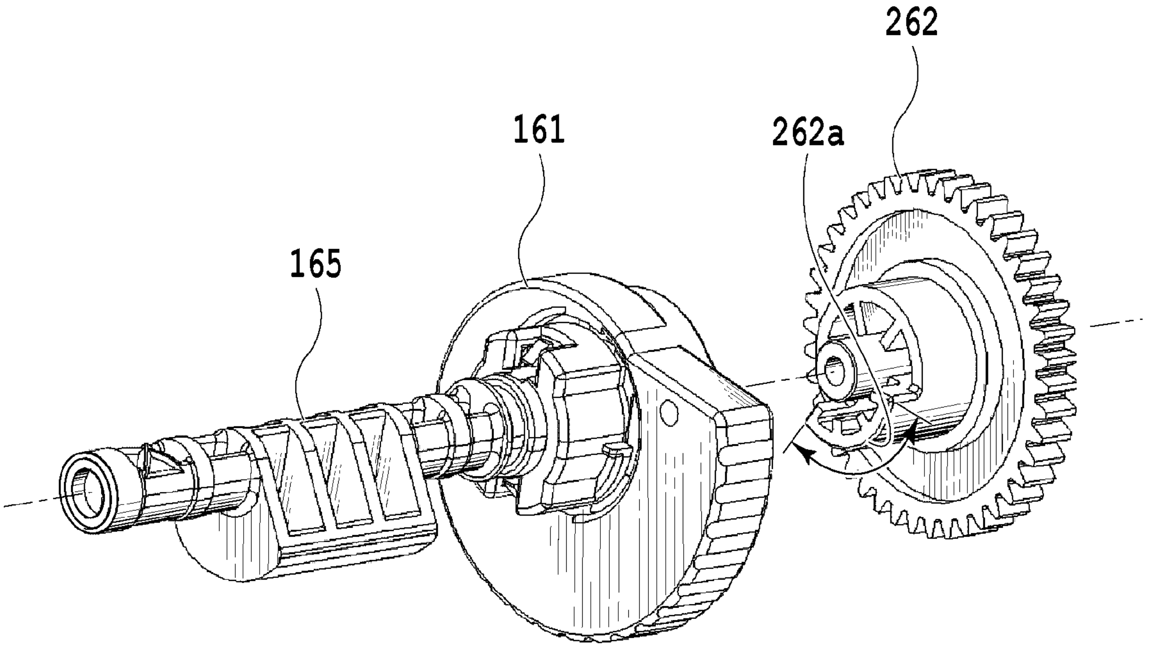
FIGS. 13A and 13B are diagrams for explaining a relation of engagement between the operating unit and the drive transmission gear.
Figure 13B:
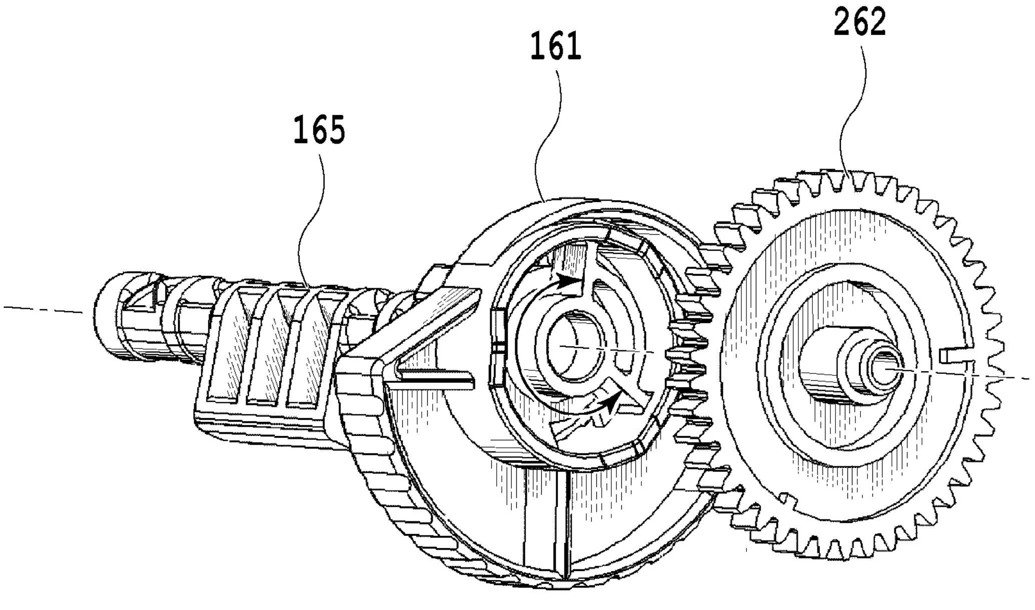

Next, a description will be given of the automatic operation and the manual operation of the on-off valve mechanism 160 of the present embodiment. FIGS. 12A to 12C are cross-sectional views of the operating unit 161 and the engagement portion 262*a* of the drive transmission gear 262. FIG. 12A is the cross-sectional view corresponding to the state where the on-off valve mechanism 160 establishes communication of the supply tube 17, that is, the open state in FIG. 9A. FIG. 12B is the cross-sectional view corresponding to the state where the on-off valve mechanism 160 closes the supply tube 17, that is, the closed state in FIG. 9B. Although not illustrated in FIGS. 12A to 12C, the displacement member 164 is displaced for opening and closing as a consequence of the rotation of the cam 165 along with the rotation of the operating unit 161 as described above. In other words, the supply tube 17 is opened or closed in accordance with the rotation of the operating unit 161. Meanwhile, FIGS. 13A and 13B are diagrams for explaining a relation of engagement between the operating unit 161 and the drive transmission gear 262. FIGS. 13A and 13B show the diagrams in a state where the drive transmission gear 262 is separated from the operating unit 161 in the axial direction. In the following, a description will be given of a structure of the operating unit 161 that achieves both an automatic opening/closing operation and a manual opening/closing operation.

As shown in FIGS. 12A to 12C, the operating unit 161 includes the operating surface 161*a*, an irregular surface 161*b*, a first engagement surface 161*c*, and a second engagement surface 161*d*. A first direction in FIGS. 12A to 12C is a direction to rotate the engagement portion 262*a* in a forward direction while a second direction therein is a direction to rotate the engagement portion 262*a* in a reverse direction. In the case of automatically opening and closing the on-off valve mechanism 160 by driving the motor 265 in the present embodiment, the on-off valve mechanism 160 transitions to the open state or the closed state by means of rotation in the first direction. However, the on-off valve mechanism 160 may be configured to transition to the open state or the closed state by means of rotation in the second direction by driving the motor 265. In the state of establishing communication of the supply tube 17 as shown in FIG. 12A, the engagement portion 262*a* is engaged with the first engagement surface 161*c* of the operating unit 161. In this state shown in FIG. 12A, the engagement portion 262*a* is rotated in the first direction by rotating the motor 265 in a predetermined amount. Thus, a force to rotate in the first direction is also applied to the first engagement surface 161*c* in contact with the engagement portion 262*a*, whereby the operating unit 161 is also rotated. In short, it is possible to cause the supply tube 17 to transition automatically to the closed state as shown in FIG. 12B by driving the motor 265. Thus, the on-off valve mechanism 160 can be automatically closed. Accordingly, in the case where the user transports the printer at the time of a normal operation, for example, it is possible to close the on-off valve mechanism 160 automatically. Hence, it is possible to reduce the possibility of a situation where the user forgets to close the valve by hand work.

In the meantime, in FIG. 12A, a space 171 is formed in a circumferential direction between the second engagement surface 161*d* and an end portion in the second direction of the engagement portion 262*a*. The engagement portion 262*a* is not in contact with the second engagement surface 161*d* in this space 171. In other words, the user can manually rotate and move the operating unit 161 in a region of the space 171. In short, in the state of FIG. 12A, a position of the engagement portion 262*a* of the drive transmission gear 262 does not change as long as the motor 265 is not driven. On the other hand, since the space 171 is formed, the user can rotate the operating unit 161 in the first direction. As a consequence, the user can manually close the supply tube 17. In the state shown in FIG. 12A, as the user rotates the operating unit 161 in the first direction, the second engagement surface 161*d* is brought into engagement with the engagement portion 262*a* of the drive transmission gear 262.

Needless to say, it is possible to automatically transition from the state where the supply tube 17 is closed as shown in FIG. 12B to the state where the supply tube 17 is open as shown in FIG. 12A. Specifically, the operating unit 161 returns from the state shown in FIG. 12B back to the state shown in FIG. 12A by further rotating the motor 265 in the forward direction. However, the present invention is not limited only to this example. The engagement portion 262*a* of the drive transmission gear 262 may be brought into contact with the second engagement surface 161*d* by rotating the motor 265 in the reverse direction, and the engagement portion 262*a* of the drive transmission gear 262 may be brought into contact with the second engagement surface 161*d* by continuously rotating the engagement portion 262*a* in the second direction, thereby returning the operating unit 161 back to the position indicated in FIG. 12A. Here, the drive transmission gear 262 (the engagement portion 262*a*)

will automatically return to the position indicated in FIG. 12A by rotating the drive transmission gear 262 in the first direction thereafter.

As described above, according to the present embodiment, it is possible to achieve both the automatic operation and the manual operation of the on-off valve mechanism 160. In this way, the user can manually close the on-off valve mechanism 160 even in a case where the on-off valve mechanism 160 cannot be automatically closed in a power off state of the printing apparatus 100 due to the occurrence of an error, for example. On the other hand, the on-off valve mechanism 160 can be closed automatically at the time of a normal operation. Accordingly, the on-off valve mechanism 160 can be closed without depending on the state of the printer at the time of transporting the printing apparatus 100, for instance. Thus, it is possible to suppress the leakage of the ink to the outside of the printing apparatus 100.

Second Embodiment

A second embodiment will describe an operation to suppress an erroneous operation by the user after closing the supply tube 17. The configuration of the printing apparatus 100 is the same as the configuration described in the first embodiment, and explanations thereof will be omitted.

FIG. 12C is a cross-sectional view of the operating unit 161 and the engagement portion 262*a* in a state where the on-off valve mechanism 160 suppresses an operation to manually establish communication of the supply tube 17. The present embodiment will describe control in the case where the closing of the supply tube 17 is completed automatically by rotating the drive transmission gear 262 by driving the motor as shown in FIG. 12B. In the state shown in FIG. 12B, the space 171 is formed in the circumferential direction between the second engagement surface 161*d* and the end portion in the second direction of the engagement portion 262*a* of the drive transmission gear 262. For this reason, the user can further rotate the operating unit 161 in the first direction in the state shown in FIG. 12B. Accordingly, the user is prone to rotate the operating unit 161 in the first direction even though the supply tube 17 is already in the state of completing the closing automatically. If the operating unit 161 is rotated further in the first direction in the state shown in FIG. 12B, the position of the displacement member 164 displaced in such a way as to crush the supply tube 17 by using the cam 165 may be changed to the position to open the supply tube 17.

Given the situation, the present embodiment is configured to perform control in such a way as to restrict the rotation of the operating unit 161 in the first direction by the manual operation of the user from the state shown in FIG. 12B. To be more precise, in FIG. 12B, the motor 265 is rotated in reverse by a predetermined driving amount after completing the closing of the supply tube 17, and then the engagement portion 262*a* is rotated and moved in the second direction as shown in FIG. 12C. In the state shown in FIG. 12C, a first space 171*a* is formed in the circumferential direction between the engagement portion 262*a* and the first engagement surface 161*c*, and a second space 171*b* is formed in the circumferential direction between the engagement portion 262*a* and the second engagement surface 161*d*. The second space 171*b* has a distance in the circumferential direction which is smaller than that of the first space 171*a*, and a size of the second space 171*b* is equivalent to a size (a distance) equal to or below an amount of rotation of the cam 165 with which the displacement member 164 can keep the supply tube 17 closed. In this way, even if the user erroneously performs the operation to rotate the operating surface 161*a* in the first direction so as to open the supply tube 17, the engagement portion 262*a* is engaged with the second engagement surface 161*d* before opening the supply tube 17. Thus, it is possible to restrict the rotation of the operating unit 161 in the first direction. As a consequence, it is possible to keep the supply tube 17 from being manually opened (establishing communication) by mistake, and thus to prevent the leakage of the ink to the outside of the printing apparatus 100.

In the case where the third cover member 41 is opened after the normal closing operation, the operating unit 161 is disposed at the opening portion 190 located lower than the third wall 193, and the operating surface 161*a* is disposed in such a way as to be exposed to the opening portion 190 as shown in FIGS. 7A and 7B. Accordingly, the user can access only the operating surface 161*a* in the case of operating the on-off valve mechanism 160 after the normal closing operation. Thus, it is possible to suppress the operation by the user to rotate the operating unit in the second direction. As described above, the present embodiment is configured to solely accept the manual operation of the operating unit 161 by the user in the case where this operation rotates the operating unit 161 in the first direction. However, the present invention is not limited only to this configuration. For example, the user may be allowed to rotate the operating unit 161 in the second direction in the state shown in FIG. 12C. By allowing the user to rotate the operating unit 161 in the second direction, the operation to open the supply tube 17 becomes an operation in a state recognized by the user as indicated with the print mark 166 and the maintenance mark 167 in FIGS. 7A and 7B. Hence, the user may be permitted to rotate the operating unit 161 in the second direction. Note that an external form of the operating unit 161 is not limited only to the shape illustrated in FIGS. 7A and 7B among other drawings. The operating unit 161 may be formed into an arbitrary shape as long as the user can manually operate the operating unit 161.

Figure 14:
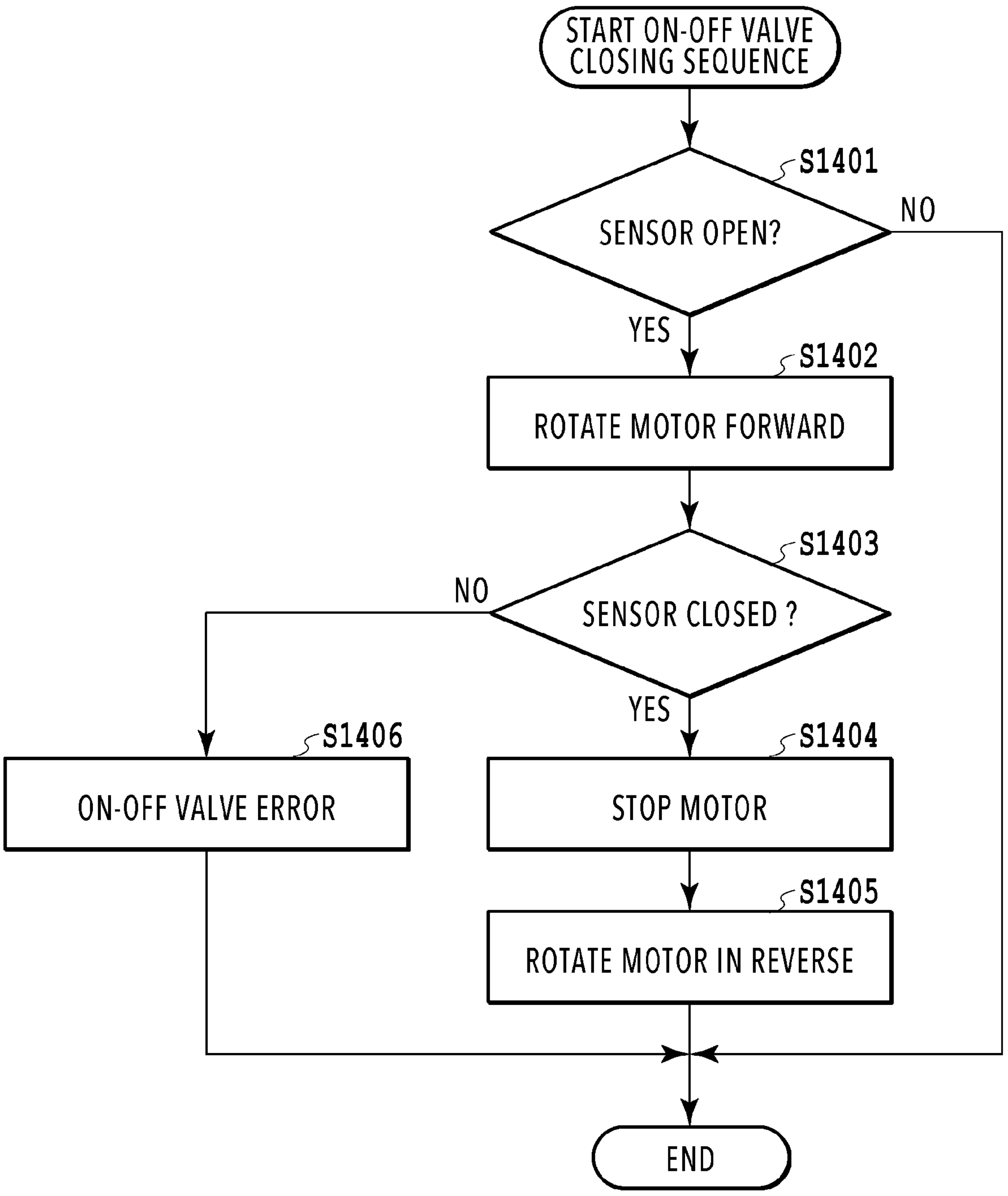
FIG. 14 is a flowchart showing an example of processing of a supply tube closing operation.

FIG. 14 is a flowchart showing an example of processing by the MPU 601 in a supply tube closing operation. For example, this flowchart is realized by causing the MPU 601 to read a program stored in the ROM 602, then to load the program in the RAM 603, and then to execute the program. In the meantime, this flowchart is started in the case where the printing apparatus 100 starts the operation to close the on-off valve mechanism 160, for example. In other words, FIG. 14 shows the flowchart of the processing to automatically close the on-off valve mechanism 160. Note that the processing in this flowchart is merely an example and the present invention is not limited only to this processing.

In S1401, the MPU 601 checks whether or not the on-off valve sensor 168 is in a state of detecting the open state of the displacement member 164. Based on a result of detection by this on-off valve sensor 168, the MPU 601 checks the on-off state of the displacement member 164. In other words, the MPU 601 determines whether the displacement member 164 is in the open state and the supply tube 17 is open or the displacement member 164 is in the closed state and the supply tube 17 is closed. The MPU 601 proceeds to processing in S1402 in the case where the displacement member 164 is open, or proceeds to processing to terminate the operation in the case where the displacement member 164 is closed.

In S1402, the MPU 601 rotates the motor 265 forward by a predetermined amount. Thus, the drive transmission gear 262 is rotated in the first direction so that the on-off valve mechanism 160 can close the supply tube 17. Thereafter, in S1403, the MPU 601 checks whether or not the on-off valve sensor 168 is in a state of detecting the closed state of the displacement member 164. The MPU 601 proceeds to processing in S1404 in the case where the displacement member 164 is closed, or proceeds to processing in S1406 in the case where the displacement member 164 is open. Here, the MPU 601 records a history representing an on-off valve error, and then proceeds to the processing to terminate the operation. Here, in the case of the on-off valve error, retry processing may be carried out up to a ceiling of a predetermined number of times. The flow may be designed to proceed to the processing to terminate the operation in the case where the number of times of retry exceeds the ceiling of the predetermined number of times.

In S1404, the MPU 601 stops the motor 265. Thereafter, the MPU 601 proceeds to processing in S1405 to rotate the motor in reverse by a predetermined amount and then stops the motor. In this way, it is possible to bring the on-off valve mechanism 160 to the state shown in FIG. 12C, and thus to suppress the operation in which the user erroneously opens (establishes communication of) the supply tube 17 manually after closing the supply tube 17.

Figure 15:
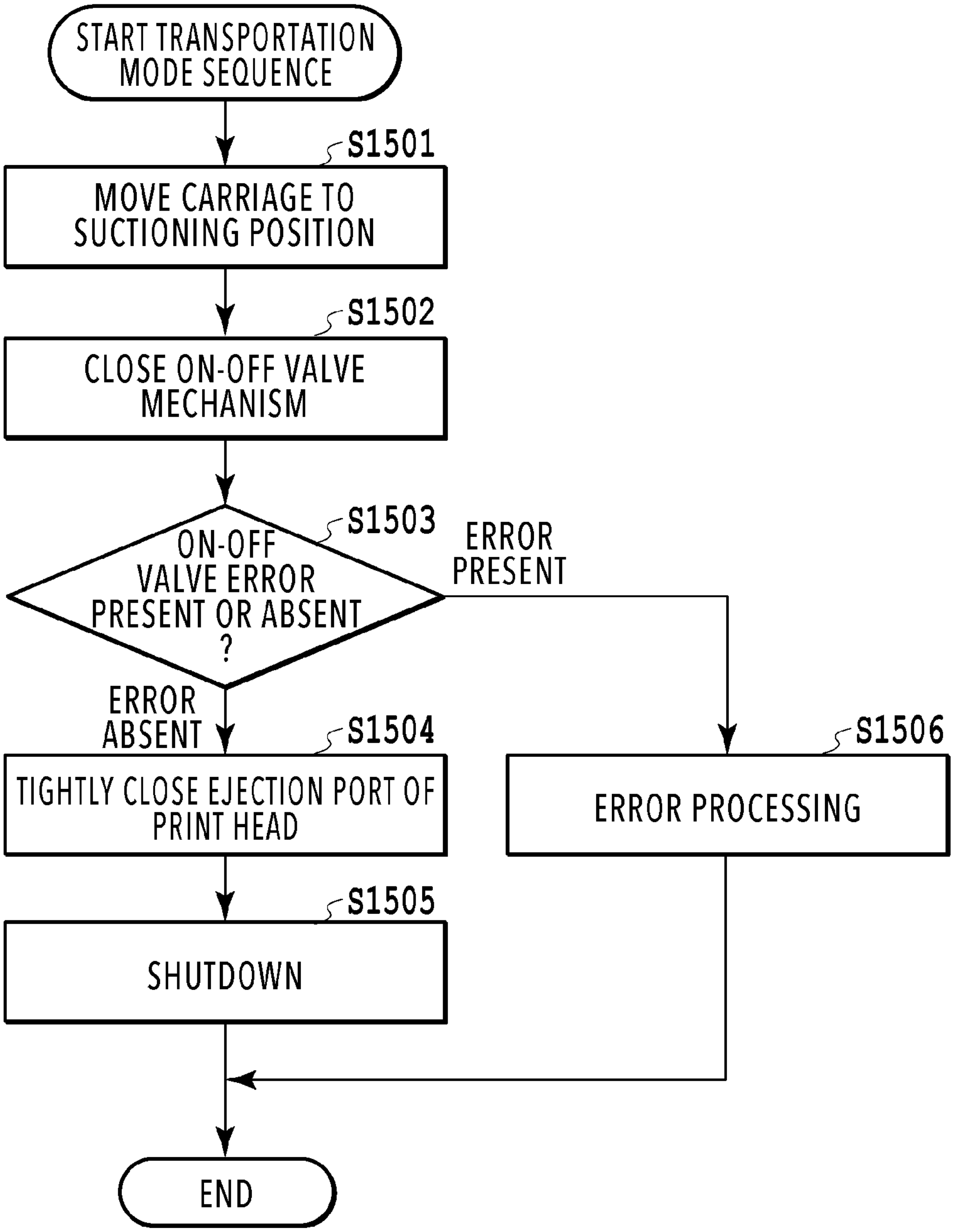
FIG. 15 is a flowchart showing an example of processing in a transportation setting mode.

FIG. 15 is a flowchart showing an example of processing by the MPU 601 in a transportation setting mode. The user may occasionally transport the printing apparatus 100 to a service center for the purpose or repair, maintenance, or the like of the printing apparatus 100. In the case of transporting the printing apparatus 100, the user can set up a transportation mode by an operation using the operation display unit 611. FIG. 15 shows a processing sequence in the case of setting this transportation mode.

As mentioned above, a measure to deal with an ink leakage is required at the time of transportation because the printing apparatus 100 may not be held in a proper attitude for use. Accordingly, in the printing apparatus 100 of the present embodiment, the MPU 601 carries out a series of processing to close the on-off valve mechanism 160 in the case where a control mode is set to the transportation setting mode. For example, this flowchart is realized by causing the MPU 601 to read a program stored in the ROM 602, then to load the program in the RAM 603, and then to execute the program.

In S1501, the MPU 601 moves to the carriage 61 to the suctioning position opposed to the suction cap 65. In S1502, the MPU 601 closes the on-off valve mechanism 160. The processing in S1502 corresponds to the processing from S1401 to S1405. In S1503, the MPU 601 determines whether an on-off valve error in S1502 is present or absent. The processing proceeds to S1504 in the case where there are no errors. Otherwise, the processing proceeds to S1506. In S1506, the MPU 601 executes processing corresponding to the on-off valve error in the transportation mode, such as processing to suspend the transportation mode and to notify the user of the error.

In S1504, the MPU 601 tightly seals an ejecting port surface of the print head 62 with the suction cap 65. In S1505, the MPU 601 carries out software shutdown processing, and then terminates the flowchart. As described above, in the case of the transportation setting mode, the MPU 601 carries out the shutdown processing of a main system after checking the closure of the on-off valve mechanism 160. Accordingly, the on-off valve mechanism 160 is definitely closed if the power source of the printing apparatus 100 is turned off in the state where the transportation setting mode is selected. In other words, the on-off valve mechanism 160 is automatically set to the closed state. In this way, it is possible to prevent the user from forgetting to manually close the on-off valve mechanism 160 at the time of transportation to the service center or the like and from forgetting the measure to deal with the ink leakage. Note that the processing from S1501 to S1505 is merely an example and the present invention is not limited only to this processing. In the meantime, the processing described in FIGS. 14 and 15 may be carried out in the first embodiment as well.

As described above, according to the present embodiment, the user can manually close the on-off valve mechanism 160 as with the first embodiment even in the case where the on-off valve mechanism 160 cannot be automatically closed at the time of the occurrence of an error and the like. In this way, it is possible to reduce the leakage of the ink from the print head 62 even in a case where a shock is applied to the printing apparatus 100 in the course of transportation and the suction cap 65 is detached from the print head 62, for example. In the case of providing the ink tank 11 of a large capacity, for instance, it is possible to suppress the leakage of the ink in the ink tank 11 from the print head 62 during the transportation, and thus to reduce soiling of the printing apparatus 100.

Meanwhile, in the present embodiment, the driving mechanism 260 is driven in reverse by a predetermined amount after the on-off valve mechanism 160 closes the ink supply channel 51 by using the driving mechanism 260. Accordingly, the engagement portion 262*a* is disposed at such a position to control an amount of manual rotation and movement of the operating unit 161. As a consequence, it is possible to keep the user from erroneously setting the on-off valve mechanism 160 to the open state after the ink supply channel 51 is automatically closed by the on-off valve mechanism 160.

Third Embodiment

The first embodiment and the second embodiment have described the on-off valve mechanism 160 which achieves both the manual opening/closing operation and the automatic opening/closing operation. The present embodiment will describe the on-off valve mechanism 160 which can be switched to a state of being capable of carrying out one of the manual opening/closing operation and the automatic opening/closing operation. Note that the configuration and various processing flows of the printing apparatus 100 are the same as those of the first and second embodiments except the configuration of the on-off valve mechanism 160. While the configuration of the on-off valve mechanism 160 is also basically the same as the configuration described in the first embodiment, a portion of the operating unit 161 to be engaged with the drive transmission gear 262 is mainly different therefrom. In the present embodiment, the space 171 discussed in the first embodiment is not formed in the state where the operating unit 161 is engaged with the engagement portion 262*a* of the drive transmission gear 262. The following description will be mainly focused on different features including this point.

Figure 16A:
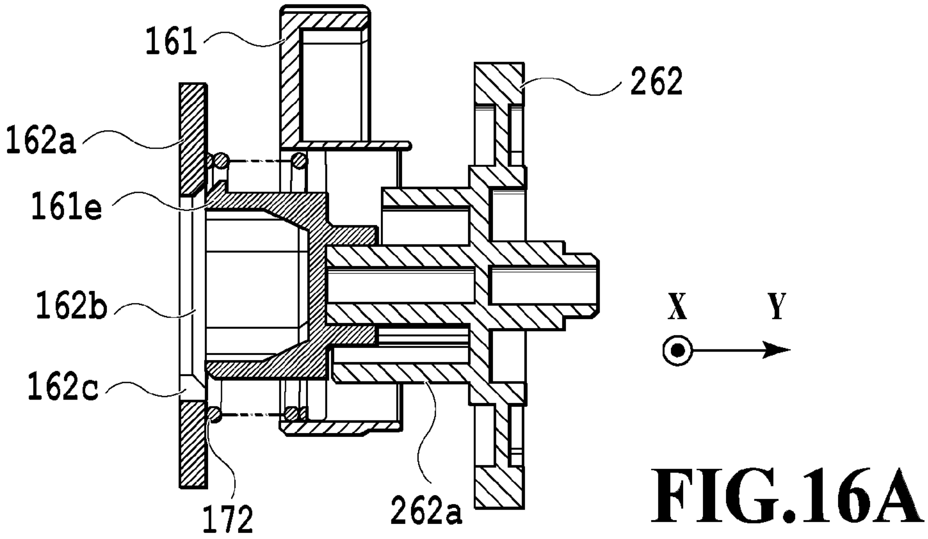
FIGS. 16A to 16C are cross-sectional views of the operating unit of the on-off valve mechanism and the drive transmission gear.
Figure 16B:
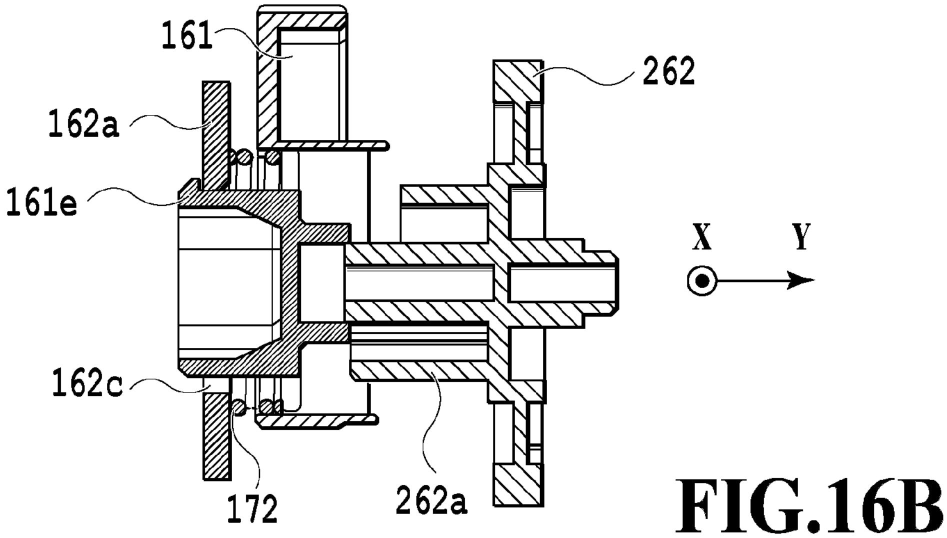
Figure 16C:
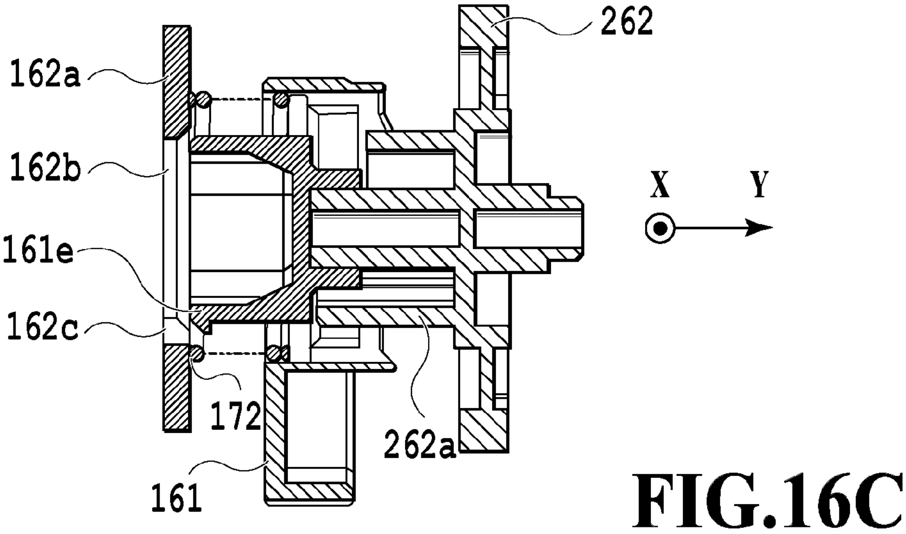

FIGS. 16A to 16C are cross-sectional views of the operating unit 161 of the on-off valve mechanism 160 and the drive transmission gear 262 of the present embodiment. FIG. 16A shows a state where the operating unit 161 is engaged with the engagement portion 262*a* of the drive transmission gear 262 and the on-off valve mechanism 160 can perform the automatic opening/closing operation only. Since the operating unit 161 is fitted into the engagement portion 262*a* without forming the space 171 (see FIGS. 12A to 12C), it is not possible to perform the manual opening/closing operation.

FIG. 16B shows a state where the operating unit 161 is located away from the engagement portion 262*a* of the drive transmission gear 262 and the on-off valve mechanism 160 can only be manually operated. In short, since the drive transmission gear 262 is not engaged with the operating unit 161, the operating unit 161 is not rotated even if the drive transmission gear 262 is rotated. In other words, it is not possible to perform the automatic opening/closing operation. On the other hand, the user can perform the manual opening/closing operation manually.

The operating unit 161 of the present embodiment includes a claw portion 161*e*. As shown in FIG. 16A, the operating unit 161 is biased in +y direction in FIGS. 16A to 16C, for example, relative to the drive transmission gear 262 by using a second biasing member 172. The cover member 162 of the present embodiment includes a fourth wall 162*a*. The fourth wall 162*a* includes an opening portion 162*b* and a cut-off portion 162*c*. The operating unit 161 is made movable in ±y directions through the opening portion 162*b*, for example. The operating unit 161 can be moved in ±y directions by the manual operation by the user. Meanwhile, a movement mechanism may be formed by using a solenoid, a motor, and the like that are not illustrated. Alternatively, the movement of this operating unit 161 may be carried out in conjunction with the cover sensor 18.

In FIG. 16A, the engagement portion 262*a* of the drive transmission gear 262 and an engagement portion of the operating unit 161 are engaged with each other in a state of not forming the space 171 (FIGS. 12A to 12C) described in the first embodiment, so that the on-off valve mechanism 160 can perform an automatic driving operation only. Although the description has been given of the example in which the fourth wall 162*a* is formed on the cover member 162, the fourth wall 162*a* may be replaced by the first wall 191 in FIG. 7A or 7B.

In the case where the operating unit 161 is moved in −y direction from the state in FIG. 16A, the claw portion 161*e* comes into engagement in y direction with the fourth wall 162*a* as shown in FIG. 16B. In this instance, the engagement portion 262*a* of the drive transmission gear 262 is located away in y direction from the operating unit 161 and there is not a region to come into engagement in the first direction or the second direction in shown FIG. 12. As a consequence, the drive of the driving mechanism 260 (FIG. 8) is not transmitted to the operating unit 161. As a consequence, it is possible to perform the manual operation only.

FIG. 16C shows a state where it is possible to perform only the automatic opening/closing operation after the on-off valve mechanism 160 is closed by the manual operation. Note that illustration of the cam 165 to be engaged with the operating unit 161 is omitted in FIG. 16C. In the case of rotating the operating unit 161 in the first direction shown in FIGS. 12A to 12C from the state of FIG. 16B, it is possible to rotate the claw portion 161*e* to a position opposed to the cut-off portion 162*c* as shown in FIG. 16C. At this position, the on-off valve mechanism 160 can close the supply tube 17. Next, since the claw portion 161*e* and the fourth wall 162*a* do not have a region for engagement in y direction in the case where the claw portion 161*e* reaches the position to be opposed to the cut-off portion 162*c*, the operating unit 161 is moved in +y direction by the second biasing member 172. In this way, the engagement portion 262*a* of the drive transmission gear 262 comes into engagement with the engagement portion of the operating unit 161 in the state of not forming the space 171, thus enabling automatic driving of the on-off valve mechanism 160 only.

In other words, in the case where the user closes the supply tube 17 by operating the operating unit 161 in the state where the operating unit 161 can only be operated manually, the operating unit 161 transitions to the state where the operating unit 161 can perform automatic opening/closing drive only. As described above, the on-off valve mechanism 160 of the present embodiment can switch between the automatic operation and the manual operation. Accordingly, even if the user operates the on-off valve mechanism 160 manually immediately after closing the supply tube 17 manually, the user cannot rotate the operating unit 161 since the operating unit 161 is connected to the driving mechanism 260. In this way, it is possible to keep the user from erroneously establishing communication of the supply tube 17 immediately after closing the supply tube 17.

As described above, in the present embodiment, the operating unit 161 is formed to be movable in an arbitrary direction. Moreover, the operating unit 161 is biased toward the drive transmission gear 262 in this direction of movement and is also engaged with the fourth wall 162*a*. Accordingly, the on-off valve mechanism 160 is configured to be capable of switching between the automatic operation and the manual operation. By configuring the on-off valve mechanism 160 to be capable of switching between the automatic operation and the manual operation, it is possible to suppress an erroneous manual operation of the on-off valve mechanism 160 in the course of transportation of the printing apparatus 100 and the like. Thus, it is possible to suppress the leakage of the ink to the outside of the printing apparatus 100.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-020359, filed Feb. 12, 2021, which is hereby incorporated by reference wherein in its entirety.

What is claimed is:

1. A printing apparatus comprising:

a container for a liquid configured to contain a liquid to be supplied to a print head configured to eject the liquid;

a supply channel used to supply the liquid from the container to the print head; and a valve disposed at the supply channel and configured to be switched between an open state to establish communication of the supply channel and a closed state not to establish communication of the supply channel, wherein the valve is configured to be switched by an automatic operation and is further configured to be switched by a manual operation.

2. The printing apparatus according to claim 1, wherein the valve includes:

an operating unit configured to manually operate on and off of the valve; and a drive transmission unit configured to transmit drive from a driving unit to the operating unit.

3. The printing apparatus according to claim 2, wherein the drive transmission unit includes an engagement portion configured to contact with the operating unit, and a space in which the engagement portion is kept from being contacted with the operating unit in a circumferential direction of the drive transmission unit is formed between the engagement portion and the operating unit in any of a first direction of rotation of the drive transmission unit and a second direction being opposite to the first direction.

4. The printing apparatus according to claim 2, wherein a center of rotation of the operating unit is located substantially coaxially with a center of rotation of the drive transmission unit.

5. The printing apparatus according to claim 2, further comprising:

an opening portion in which the operating unit is disposed, wherein the opening portion includes a wall being higher in a direction of gravitational force than the operating unit with respect to the printing apparatus held in a proper attitude for use.

6. The printing apparatus according to claim 2, wherein the driving unit comprises a motor, and the automatic operation includes driving by the motor.

7. The printing apparatus according to claim 2, further comprising:

a cover member pivotally supported by the printing apparatus in an openable and closable manner, wherein the operating unit is not manually operable by a user with the cover member closed and is manually operable by a user with the cover member open.

8. The printing apparatus according to claim 3, wherein the first direction is a direction to cause the valve to transition to the closed state, and a first engagement surface of the operating unit is engaged with the engagement portion in the open state of the valve.

9. The printing apparatus according to claim 3, wherein the first direction is a direction to cause the valve to transition to the closed state from the open state, and a distance in the circumferential direction between a first engagement surface of the operating unit and the engagement portion in the closed state of the valve is larger than a distance in the circumferential direction between a second engagement surface of the operating unit and the engagement portion.

10. The printing apparatus according to claim 3, wherein the operating unit includes an operating surface configured to enable a rotating operation manually in the first direction.

11. The printing apparatus according to claim 3, wherein the driving unit is configured to rotate the drive transmission unit in reverse by a predetermined amount in the second direction after rotating the drive transmission unit in the first direction and switching the valve to the closed state.

12. The printing apparatus according to claim 1, wherein the container includes an injection port configured to enable a user to inject the liquid.

13. The printing apparatus according to claim 1, further comprising a suction unit configured to suction the liquid from the print head, wherein the suction unit carries out a suctioning operation to suction the liquid from the print head with the valve closed.

14. The printing apparatus according to claim 1, further comprising a valve unit disposed at the supply channel between the container and the valve and configured to be switched between an open state to establish communication of the supply channel and a closed state not to establish communication of the supply channel.

15. The printing apparatus according to claim 1, the printing apparatus is an inkjet printing apparatus which applies ink to a print medium.

16. The printing apparatus according to claim 15, wherein the print medium comprises paper.

17. A printing apparatus comprising:

a container for a liquid configured to contain a liquid to be supplied to a print head configured to eject the liquid;

a supply channel used to supply the liquid from the container to the print head; and a valve disposed at the supply channel and configured to be switched between an open state to establish communication of the supply channel and a closed state not to establish communication of the supply channel, wherein the valve is configured to execute switching either by an automatic operation or by a manual operation.

18. The printing apparatus according to claim 17, wherein the valve includes:

an operating unit configured to manually operate on and off of the valve; and a drive transmission unit configured to transmit drive from a driving unit to the operating unit, and the operating unit is configured to be capable of being moved in a receding direction from the drive transmission unit.

19. The printing apparatus according to claim 18, wherein the operating unit is biased by a biasing unit toward the drive transmission unit in a direction opposite to the receding direction.

20. The printing apparatus according to claim 18, wherein the drive transmission unit includes an engagement portion to be engaged with the operating unit, and the engagement portion contacts with the operating unit both in a first direction of rotation of the drive transmission unit and in a second direction being opposite to the first direction.

* * * * *